(12) United States Patent
Kaeriyama

(10) Patent No.: US 10,116,198 B2
(45) Date of Patent: Oct. 30, 2018

(54) SWITCHING SYSTEM

(71) Applicant: Renesas Electronics Corporation, Tokyo (JP)

(72) Inventor: Shunichi Kaeriyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/856,692

(22) Filed: Dec. 28, 2017

(65) Prior Publication Data

US 2018/0269773 A1    Sep. 20, 2018

(30) Foreign Application Priority Data

Mar. 14, 2017    (JP) .................................. 2017-049171

(51) Int. Cl.
| | |
|---|---|
| H02J 3/12 | (2006.01) |
| G05F 1/00 | (2006.01) |
| H02J 3/00 | (2006.01) |
| H02M 5/42 | (2006.01) |
| H02M 7/68 | (2006.01) |
| H02M 3/24 | (2006.01) |
| H02M 7/44 | (2006.01) |
| H02M 1/08 | (2006.01) |

(Continued)

(52) U.S. Cl.
CPC ............ *H02M 1/08* (2013.01); *H02M 1/4208* (2013.01); *H02M 5/458* (2013.01); *H02M 7/5395* (2013.01); *H02M 2001/0009* (2013.01); *H02P 27/08* (2013.01)

(58) Field of Classification Search
CPC ... H02M 1/4208; H02M 5/453; H02M 5/4585
USPC ....... 323/225, 241, 246, 269, 272, 275, 283, 323/285; 363/34, 35, 97, 98, 124, 132, 363/136, 137
See application file for complete search history.

(56) References Cited

U.S. PATENT DOCUMENTS

| | | | | |
|---|---|---|---|---|
| 7,466,086 | B2 * | 12/2008 | Kiuchi .................... | H02P 5/74 318/400.07 |
| 8,436,573 | B2 * | 5/2013 | Uryu ..................... | B62D 5/046 318/400.01 |

(Continued)

FOREIGN PATENT DOCUMENTS

| | | |
|---|---|---|
| JP | 4682727 B2 | 5/2011 |
| JP | 2012-080740 A | 4/2012 |
| JP | 2012-182874 A | 9/2012 |

*Primary Examiner* — Gary Nash
(74) *Attorney, Agent, or Firm* — McGinn IP Law Group, PLLC.

(57) ABSTRACT

An object of the invention is to improve precision of current detection in a switching system having plural switching circuits. A first PWM timing generation circuit generates an edge timing of a PWM signal by using a comparison value and a count value and drives a first switching circuit. A second PWM timing generation circuit generates an edge timing of a PWM signal of plural phases by using a comparison value and a count value and drives a second switching circuit. One of the switching circuits is an inverter circuit of a common shunt type in which a shunt resistor is provided commonly for plural phases. One of the PWM timing generation circuits shifts the generated edge timing so that an interval between an edge timing of one of the circuits and an AD conversion timing of the other becomes equal to or larger than a predetermined reference value.

20 Claims, 26 Drawing Sheets

(51) Int. Cl.
*H02M 5/458* (2006.01)
*H02M 7/5395* (2006.01)
*H02M 1/42* (2007.01)
H02P 27/08 (2006.01)
H02M 1/00 (2006.01)

(56) References Cited

U.S. PATENT DOCUMENTS

2009/0058331 A1\* 3/2009 Aoyagi ............ H02M 7/53873
　　　　　　　　　　　　　　　　　　　　　　318/255
2012/0032625 A1\* 2/2012 Suzuki ................ B62D 5/0487
　　　　　　　　　　　　　　　　　　　　　　318/490

\* cited by examiner

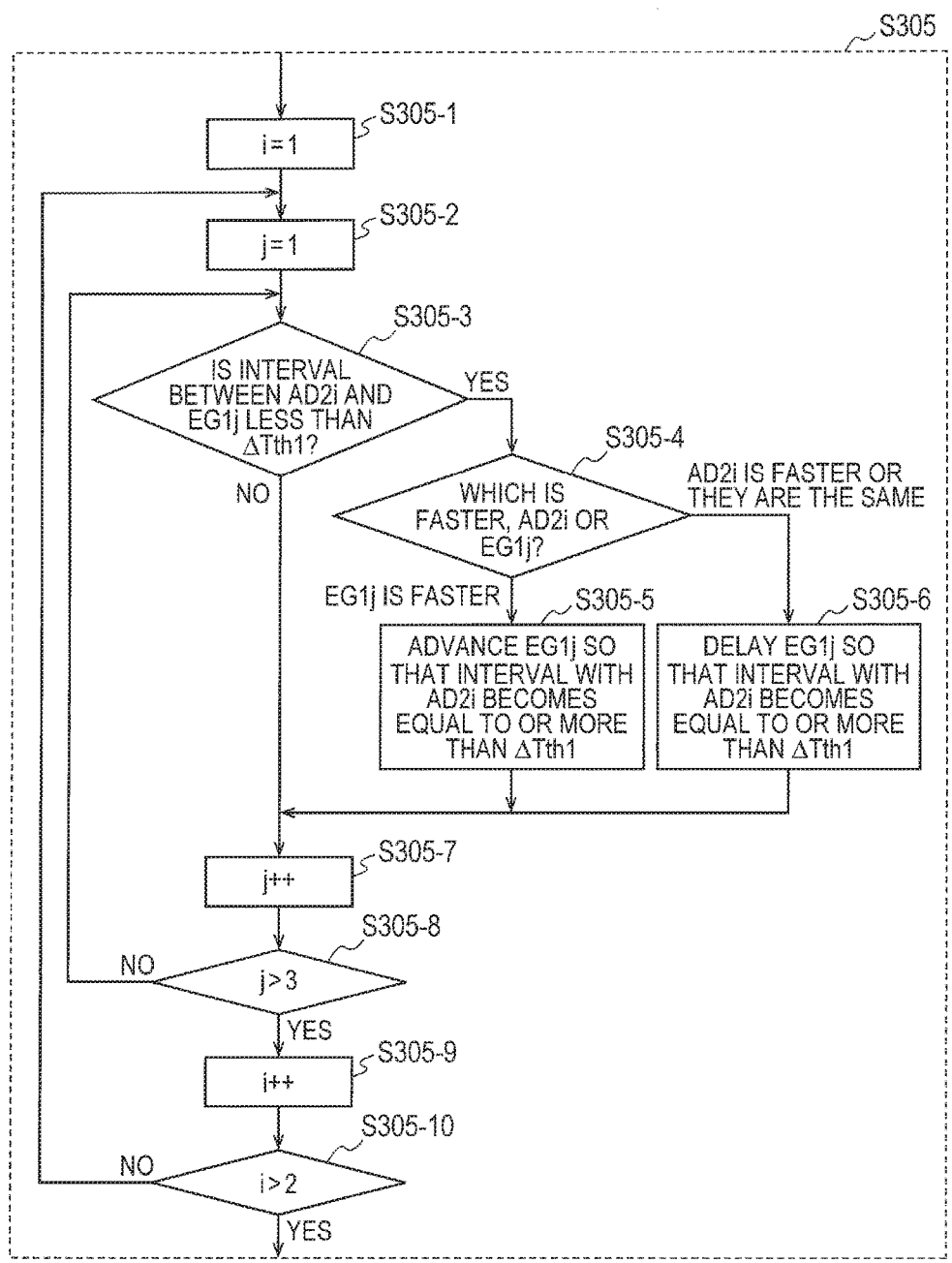

SWITCHING SYSTEM

CROSS-REFERENCE TO RELATED APPLICATIONS

The disclosure of Japanese Patent Application No. 2017-049171 filed on Mar. 14, 2017 including the specification, drawings and abstract is incorporated herein by reference in its entirety.

BACKGROUND

The present invention relates to a switching system and relates to, for example, a technique of controlling a switching timing in an inverter circuit, a power factor correction (abbreviated as PFC circuit) circuit, and the like.

Japanese Patent Publication No. 4682727 discloses, in a motor driving device of driving a plurality of motors at the same time by a plurality of inverter circuits, a method of setting PWM cycles of the plurality of inverter circuits to the same or integral multiple and performing A/D conversion at the peak or bottom (that is, the center of the PWM cycle) of a count value having a triangle-wave shape in a timer used for generation of a PWM carrier signal.

Japanese Unexamined Patent Application Publication No. 2012-80740 describes that an inverter control device is provided with means which corrects both of or one of each switching signal and a current detection timing so that noise caused by switching of a power factor improvement circuit and an inverter circuit does not interfere current detections.

Japanese Unexamined Patent Application Publication No. 2012-182874 discloses, in a motor control device, a method of controlling either a phase of a carrier signal or a duty value so that an interval in which phase currents of two phases in three phases flow at the same time for T time or longer and an interval in which at least one of the phase currents of the two phases flows singly for T time or longer are combined.

SUMMARY

For example, a switching circuit such as an inverter circuit or a PFC circuit usually has a shunt resistor for detecting current. A control device converts the current value detected by the shunt resistor to a digital value and performs a predetermined operation by using the digital value, thereby controlling a switching timing of the switching circuit. On this occasion, when switching noise by the switching circuit occurs at a sampling timing of detecting the current value, precision of detecting the current value may deteriorate. Particularly, in a switching system having a plurality of such switching circuits, switching noises by the plurality of switching circuits may occur at various timings, so that it can become more difficult to detect the current value with high precision.

For example, as disclosed in the Japanese Patent Publication No. 4682727, a method of determining PWM cycles of a plurality of switching circuits to the same and determining a sampling timing at the peak or bottom of a count value of a timer having a triangle-wave shape is considered. The method can be applied when each of the switching circuits is a 3-shunt inverter circuit having three shunt resistors or the like, and the influence of the switching noise can be reduced. However, it is difficult to apply the method in the case where the switching circuits include a 1-shunt inverter circuit having only one shunt resistor since current cannot be detected at the peak or bottom of the count value.

For example, as disclosed in the Japanese Unexamined Patent Application Publication No. 2012-80740, a method of correcting each of switching timings and/or a sampling timing so that the switching noise does not interfere each current detection is also considered. The method is considered as a useful method. However, at the time of performing the correction in practice, various devices are necessary. In the Japanese Unexamined Patent Application Publication No. 2012-80740, a concrete procedure or the like accompanying the correction is not described.

The following embodiments are made in consideration of the above and the other problems and novel features will become apparent from the description of the specification and appended drawings.

A switching system according to an embodiment has first and second PWM timing generation circuits, first and second switching circuits, and first and second AD conversion circuits. The first PWM timing generation circuit generates an edge timing of a first PWM signal by using a first count value and a first comparison value supplied, and drives the first switching circuit. The second PWM timing generation circuit generates an edge timing of a second PWM signal by using a second count value which is the same as the first count value or has a predetermined relation with the first count value and a second comparison value supplied, and drives the second switching circuit. One of the first and second switching circuits is an inverter circuit of a common shunt type in which a shunt resistor is provided commonly for a plurality of phases. The first or second PWM timing generation circuit shifts the generated edge timings so that an interval between an edge timing of one of the circuits and an AD conversion timing of the other becomes equal to or larger than a predetermined reference value.

According to the embodiment, in the switching system having the plurality of switching circuits, precision of current detection can be improved.

BRIEF DESCRIPTION OF THE DRAWINGS

FIG. 15 is a flowchart illustrating a more detailed example of processes of a part of FIG. 13.

DETAILED DESCRIPTION

Figure 1:
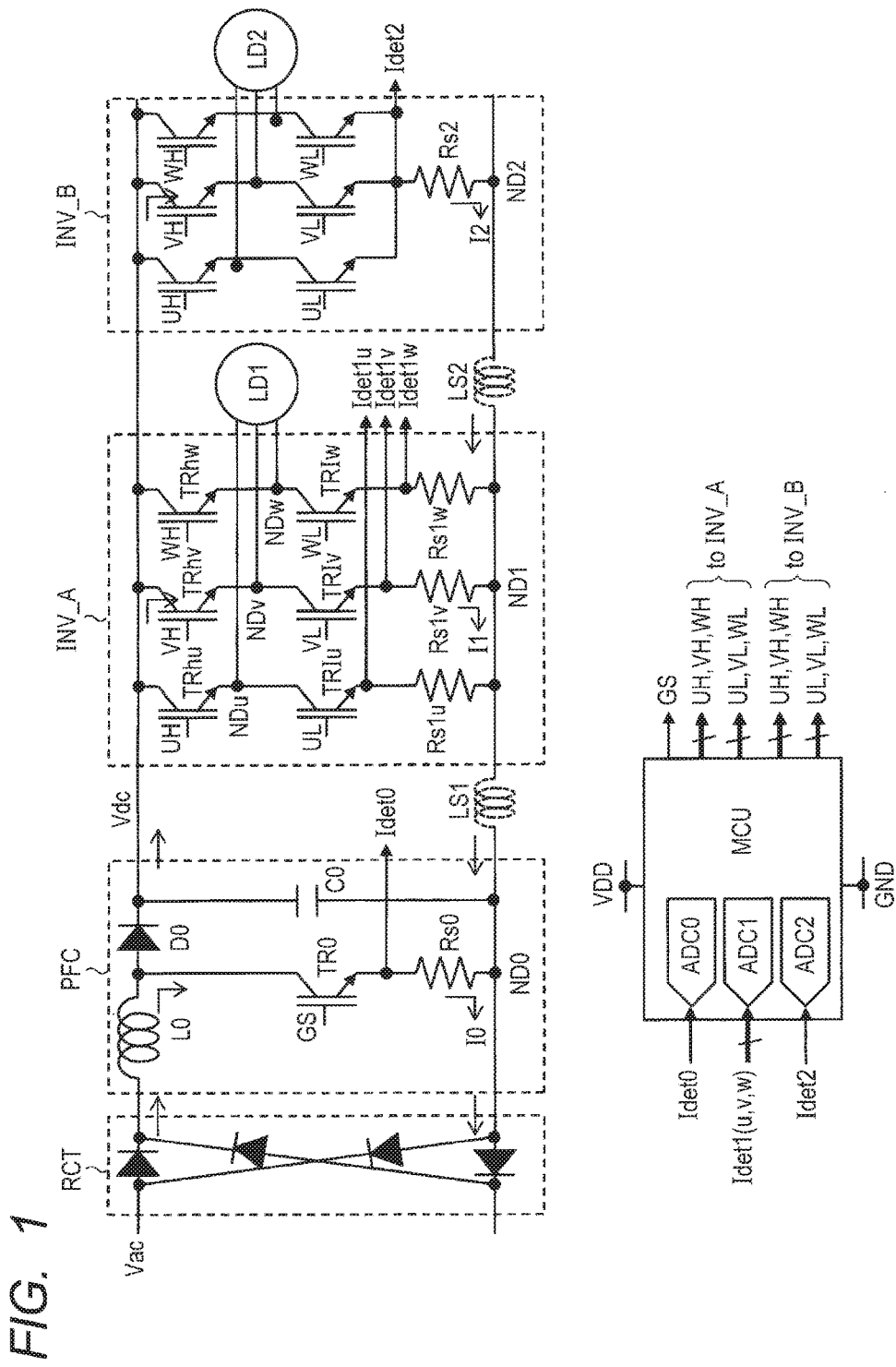
FIG. 1 is a schematic diagram illustrating a general configuration example of a switching system according to a first embodiment of the present invention.

In the following embodiments, when it is necessary for convenience, an embodiment will be described by being divided into a plurality of sections or embodiments. Unless otherwise clearly specified, they are not non-related to one another but have relations such as modification, application, detailed description, and supplementary explanation in which one is a part or all of the other. In the following embodiments, in the case of referring to the number of elements and the like (including the number of pieces, numerical value, quantity, and range), except for the case where it is clearly mentioned, the case where the invention is principally clearly limited to a specific value, and the like, the invention is not limited to the specific value. The number may be larger or smaller than the specific value.

Further, in the following embodiments, obviously, components (including operation steps) are not always necessary except for the case where it is clearly mentioned, the case where it is considered that a component is principally clearly necessary, and the like. Similarly, in the following embodiments, when shape, position relation, and the like of components are mentioned, they substantially include shape and the like close or similar to them except for the case where it is clearly mentioned, the case where it is considered that the shape and the like are not principally clearly similar. This is similarly applied also to the number and range.

Hereinafter, embodiments of the present invention will be described in detail with reference to the drawings. In all of the drawings for explaining the embodiments, the same reference numerals are designated to the same members as a rule and repetitive description will not be given.

First Embodiment

General Configuration of Switching System

FIG. 1 is a schematic diagram illustrating a general configuration example of a switching system according to a first embodiment of the present invention. The switching system of FIG. 1 has a rectifying circuit RCT, a plurality of switching circuits, a microcontroller MCU, and a plurality of load devices LD1 and LD2. Each of the switching circuits is a circuit including a switching transistor driven by a PWM (Pulse Width Modulation) signal and, in the example of FIG. 1, the switching circuits correspond to a PFC circuit PFC and inverter circuits INV_A and INV_B.

The rectifying circuit RCT has four rectifier diodes and full-wave rectifies an input AC potential Vac. The PFC circuit PFC has an inductor L0, a switching transistor TR0, a shunt resistor Rs0, a diode D0, and a capacitor C0 and generates a DC power supply potential Vdc from the potential which is full-wave rectified by the rectifying circuit RCT. The switching transistor TR0 is, for example, an IGBT (Insulated Gate Bipolar Transistor), a MOSFET (Metal Oxide Semiconductor Field Effect Transistor), or the like.

Concretely, the PFC circuit PFC controls average current flowing in the inductor L0 (and current supplied to the rectifying circuit RCT) into a sine wave shape by the switching of the switching transistor TR0 and also generates, at both ends of the capacitor C0, a boosted power supply potential (DC power supply potential Vdc) of a predetermined level when the potential of a node ND0 as a grounding power supply potential is a reference. The shunt resistor Rs0 coupled to one end (in this case, the emitter node) of the switching transistor TR0 generates a detection current signal Idet0 by detecting current flowing in the inductor L0 and converting the current to voltage.

Each of the inverter circuits INV_A and INV_B has a plurality of (in this case, three phases of) high-side transistors TRhu, TRhv, and TRhw and low-side transistors TRlu, TRlv, and TRlw as switching transistors (for example, IGBTs, MOSFETs, or the like). For example, in the inverter circuit INV_A, the high-side transistor TRhu of the u phase is provided between the DC power supply potential Vdc and the u-phase output node NDu, and the low-side transistor TRlu of the u phase is provided between the u-phase output node NDu and a node ND1 as the grounding power supply potential. Similarly, the high-side transistor TRhv and the low-side transistor TRlv of the v phase are provided on the DC power supply potential Vdc side of a v-phase output node NDv and the grounding power supply potential side, respectively. The high-side transistor TRhw and the low-side transistor TRlw of the W phase are provided on the DC power supply potential Vdc side of a w-phase output node NDw and the grounding power supply potential side, respectively.

The inverter circuit INV_A generates AC potential (AC power) of three phases at the output nodes (NDu, NDv, and NDw) of the phases by switching of the switching transistors (TRhu, TRhv, TRhw, TRlu, TRlv, and TRlw) and drives the load device LD1 by the AC power. The load device LD1 is, for example, a 3-phase motor mounted on a compressor, a fan, or the like. Similarly, the inverter circuit INV_B generates AC potential (AC power) of three phases at the output nodes of the phases by switching of the switching transistors provided between the DC power supply potential Vdc and the node ND2 as the grounding power supply potential and drives the load device LD2 such as a 3-phase motor or the like by the AC power.

The inverter circuit INV_A further includes three shunt resistors Rs1$u$, Rs1$v$, and Rs1$w$ to detect drive currents in the phases. The shunt resistor Rs1$u$ is coupled between one end (in this case, the emitter node) of the low-side transistor TR1$u$ and the node ND1, the shunt resistor RS1$v$ is coupled between one end of the low-side transistor TR1$v$ and the node ND1, and the shunt transistor RS1$w$ is coupled between one end of the low-side transistor TR1$w$ and the node ND1. The shunt resistor Rs1$u$ detects the drive current of the u phase in the on period of the low-side transistor TRlu and converts it to voltage, thereby generating a detection current signal Idet1$u$. Similarly, the shunt resistor Rs1$v$ detects the drive current of the v phase in the on period of the low-side transistor TRlv and converts it to voltage, thereby generating a detection current signal Idet1$v$, and the shunt resistor Rs1$w$ detects the drive current of the w phase in the on period of the low-side transistor TRlw and converts it to voltage, thereby generating a detection current signal Idet1$w$. In the specification, an inverter circuit in which shunt resistors are provided separately for the three phases as described above is called an inverter circuit of a separate shunt type or a 3-shunt inverter circuit.

On the other hand, different from the inverter circuit INV_A, the inverter circuit INV_B has one shunt resistor Rs2 to detect drive currents in the phases. The shunt resistor Rs2 is coupled between a common coupling node (in this case, the emitter node) of the low-side transistors TRlu, TRlv, and TRlw of three phases and a node ND2. As the details will be described with reference to FIG. 2, the shunt resistor Rs2 generates a detection current signal Idet2 by detecting the drive currents of the three phases on the basis of combinations of on/off states of the low-side transistors TRlu, TRlv, and TRlw and converting them to voltage. In the specification, the inverter circuit in which a shunt resistor is provided commonly for the three phases as described above is called an inverter circuit of a common shunt type or a 1-shunt inverter. Although an inverter circuit using a current transformer or the like also exists, particularly in household electric appliances and the like, in many cases, a 3-shunt inverter circuit or a 1-shunt inverter circuit is used.

The microcontroller (in other words, a semiconductor device or a control device) MCU is constructed by, for example, a single semiconductor chip, operates on a power supply potential VDD using the grounding power supply potential GND as a reference, and controls the switching circuits (PFC, INV_A, and INV_B). The microcontroller MCU has a plurality of analog-to-digital conversion circuits (abbreviated as AD conversion circuits) ADC0 to ADC2. The AD conversion circuit ADC0 converts the detection current signal (that is, analog value) Idet0 from the shunt resistor Rs0 in the PFC circuit PFC to a digital value. The microcontroller MCU generates a gate control signal GS as a PWM signal by reflecting the digital value and switching-controls the switching transistor TR0 in the PFC circuit PFC by the gate control signal GS.

The analog-to-digital conversion circuit ADC1 (in reality, a plurality of analog-to-digital conversion circuits are provided) converts detection current signals (analog values) Idet1$u$, Idet1$v$, and Idet1$w$ from the shunt resistors Rs1$u$, Rs1$v$, and Rs1$w$ in the inverter INV_A to digital values. The microcomputer MCU generates gate control signals UH, VH, and WH as PWM signals by reflecting the digital values and switching-controls the high-side transistors TRhu, TRhv, and TRhw in the inverter circuit INV_A by the gate control signals UH, VH, and WH, respectively. The microcomputer MCU also generates gate control signals UL, VL, and WL which become complementary signals (strictly, including a deviation accompanying dead time and the like) to the gate control signals UH, VH, and WH and switching-controls the low-side transistors TRlu, TRlv, and TRlw in the inverter circuit INV_A by the gate control signals UL, VL, and WL, respectively.

Similarly, the analog-to-digital conversion circuit ADC2 converts the detection current signal Idet2 from the inverter circuit INV_B to a digital value. The microcontroller MCU generates the gate control signals UH, VH, WH, UL, VL, and WL which become PWM signals by reflecting the digital value and switching-controls the switching transistors in the inverter circuit INV_B.

Figure 2:
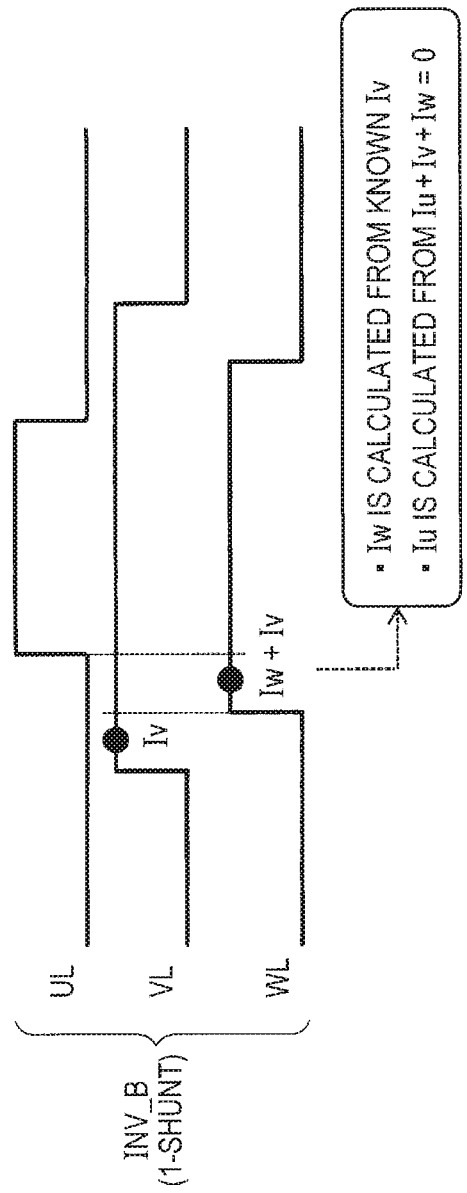
FIG. 2 is a timing chart illustrating an example of timings of current detection of a 1-shunt inverter circuit in FIG. 1.

FIG. 2 is a timing chart illustrating an example of timings of current detection of the 1-shunt inverter circuit in FIG. 1. In the 1-shunt inverter circuit INV_B, first, a first current value is detected in the period in which only one phase in the low-side transistors TRlu, TRlv, and TRlw is on. In the example of FIG. 2, a current value Iv of the v phase is detected as the detection current signal Idet2 accompanying the 'H' level (on level) of the gate control signal VL of the v phase and the 'L' level (off level) of the gate control signals UL and WL of the u phase and the w phase.

Subsequently, a second current value is detected in a period in which two phases in the low-side transistors TRlu, TRlv, and TRlw are on. In the example of FIG. 2, a total value of the current value Iv of the v phase and a current value Iw of the w phase is detected as the detection current signal Idet2 accompanying the 'H' level of the gate control signals VL and WL of the v phase and the w phase and the 'L' level of the gate control signal UL of the u phase. Since the current value Iv of the v phase is already read as the first current value, by subtracting the first current value from the second current value, the current value Iw of the w phase can be calculated. Further, the sum (Iu+Iv+Iw) of the current values flowing in the three phases becomes zero from the Kirchhoff's law, the current value Iu (=Iv−Iw) can be also calculated.

As described above, the current values of the three phases can be detected by a single shunt resistor Rs2. If duty values of two phases are equivalent (for example, the case where the rising edges of the gate control signals UL and WL match), a process of shifting both edges of one of the phases (for example, the gate control signal UL) in advance is performed to assure the sampling timing of the current value (Iw+Iv). Although current detection is performed at the part of the rising edge of the gate control signal, similarly, current detection can be performed at the part of the falling edge.

In FIG. 1, for example, the rectifying circuit RCT, the plurality of switching circuits (PFC, INV_A, and INV_B), and the microcontroller MCU are constructed by individual parts and mounted in a single printed wiring board or the like or a plurality of printed boards. As a result, the three nodes ND0, ND1, and ND2 as the grounding power supply potentials are strictly separated by floating inductances LS1 and LS2 such as a wire of a printed wiring board, a cable between substrates, and the like. The potentials at the nodes change relatively according to changes in currents flowing in the switching circuits. As a result, depending on the node ND0, ND1, or ND2 to which the grounding power supply potential GND of the microcontroller MCU is coupled, the voltage of the shunt resistor looks different.

For example, when the node ND0 is coupled to the grounding power supply potential GND of the microcontroller MCU, the microcontroller MCU can detect the current I0 flowing in the shunt resistor Rs0 in the PFC circuit PFC with high precision. However, in the case of detecting the current value I1 flowing in the shunt resistor (for example, Rs1$v$) of the inverter circuit INV_A, potential of "LS1×d(I1)/dt" (in other words, ground noise) is superimposed on the grounding power supply potential GND (node ND0) according to the change in the current value I1. As a result, due to the ground noise, there is a case that the microcontroller MCU cannot detect the current value I1 with high precision. Similarly, also in the case of detecting the current value I2 flowing in the shunt resistor Rs2 of the inverter circuit INV_B, ground noise of "LS1×d (I1+I2)/dt+ LS2×d(I2)/dt" is superimposed on the grounding power supply potential GND according to the change in the current value I2 (and I1). As a result, there is a case that the microcontroller MCU cannot detect the current value I2 with high precision.

As described above, in the switching system on which two or more switching circuits are mounted, in a system in which the power supply potential/grounding power supply potential is commonly used, there is the possibility that the precision of detecting the current value by the shunt resistor deteriorates depending on the position of the wiring pattern coupling the grounding power supply potential GND of the microcontroller MCU. Particularly, in the switching circuit of switching current of a few A or larger, the above-described ground noise also increases, so that such deterioration in the detection precision may become more noticeable. Consequently, the switching system as illustrated in FIG. 1 needs a mechanism capable of reducing the influence of a floating inductance on at least two (desirably three) nodes in the nodes ND0, ND1, and ND2.

General Configuration and Problems of Switching System (Comparative Example)

Figure 22:
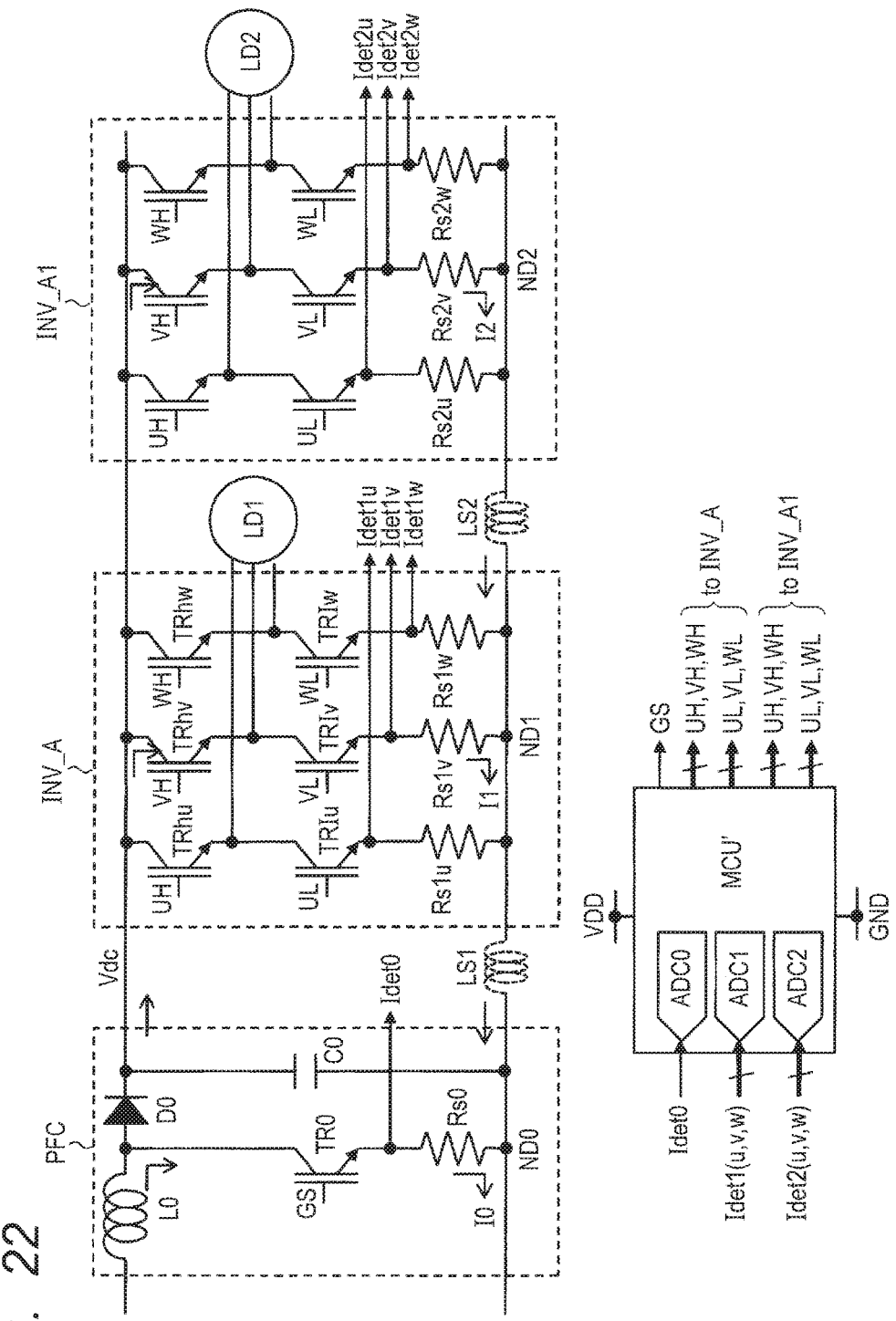
FIG. 22 is a schematic diagram illustrating a general configuration example in a switching system as a comparative example of the present invention.
Figure 23:
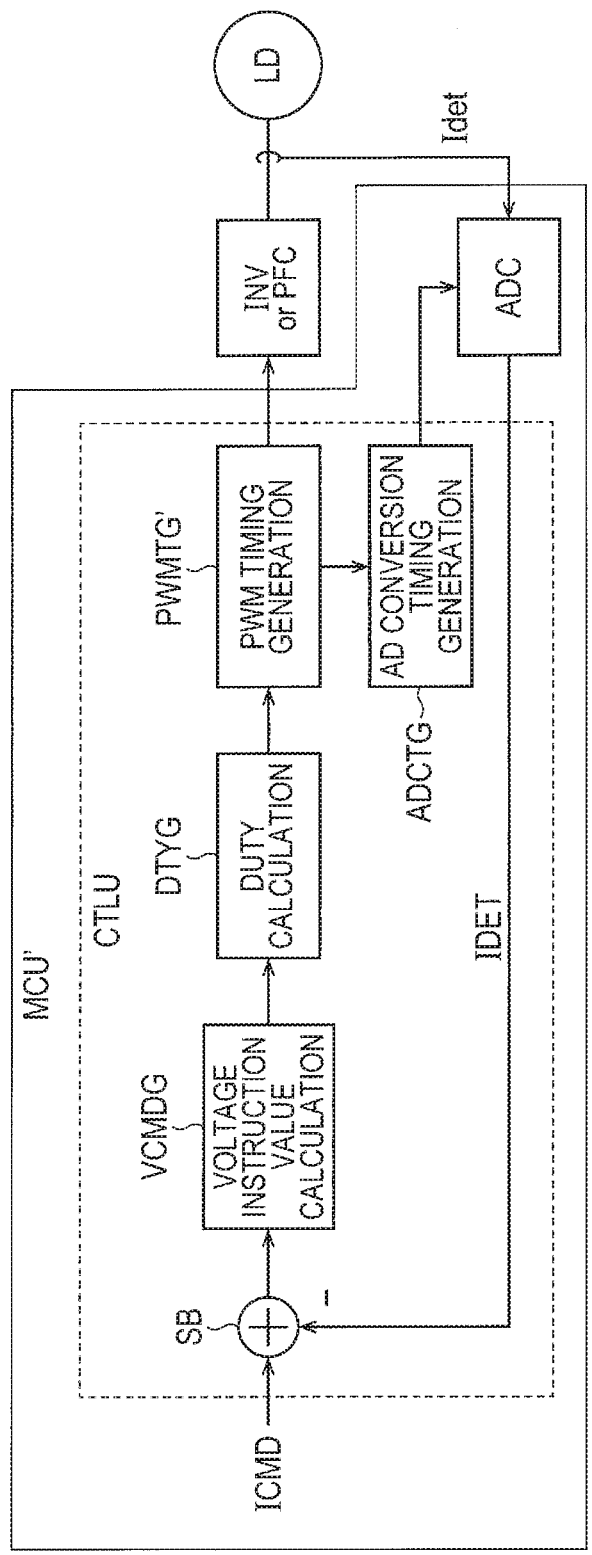
FIG. 23 is a schematic diagram illustrating a configuration example of a main part of a microcontroller in FIG. 22.

FIG. 22 is a schematic diagram illustrating a general configuration example in a switching system as a comparative example of the present invention. FIG. 23 is a schematic diagram illustrating a configuration example of a main part of a microcontroller in FIG. 22. The switching system illustrated in FIG. 22 is different from the configuration example of FIG. 1 with respect to the points that the 1-shunt inverter circuit INV_B in FIG. 1 is replaced by a 3-shunt inverter circuit INV_A1 and input/output signals of a microcontroller MCU' become different accordingly.

The microcontroller MCU' illustrated in FIG. 23 has a controller CTLU and an AD conversion circuit ADC. The controller CTLU has a subtraction circuit (error detection circuit) SB, a voltage command value calculation circuit VCMDG, a duty calculation circuit DTYG, a PWM timing generation circuit PWMTG', and an AD conversion timing generation circuit ADCTG. The AD conversion circuit ADC converts a detection current signal (analog value) Idet from an inverter circuit INV or a shunt resistor of the PFG circuit PFC to a digital value IDET.

The subtraction circuit SB calculates an error between a current command value ICMD and the digital value IDET which are calculated separately. The voltage command value calculation circuit VCMDG receives the error from the subtraction circuit SB and calculates a voltage command value for reducing the error by PID (Proportional Integral Differential) control, PD control or the like. The duty calculation circuit DTYG calculates a duty value according to the voltage command value and outputs a comparison value corresponding to the duty value. The PWM timing generation circuit PWMTG' generates, for example, an edge timing of a PWM signal of a single phase or plural phases by using a result of comparison between the comparison value from the duty calculation circuit DTYG and a count value having a triangular wave shape generated by a counter provided on the inside. The PWM timing generation circuit PWMTG' drives a switching transistor in the inverter circuit INV or the PFC circuit PFC by the PWM signal having the generated edge timing. On the basis of the edge timing of the PWM signal by the PWM timing generation circuit PWMTG', the AD conversion timing generation circuit ADCTG generates an AD conversion timing (sampling timing) of the AD conversion circuit ADC.

For example, in the case of controlling a motor as a load device LD via the inverter circuit INV, the current command value ICMD becomes a value corresponding to torque for setting the motor to predetermined rotational speed. The value is separately calculated by the microcontroller MCU' on the basis of a detection result of the rotational speed of the motor or the like. For example, in the case of driving the PFC circuit PFC, the current command value ICMD becomes a value which fluctuates in a sine-wave shape. The value is separately calculated by, for example, the microcontroller MCU' on the basis of a signal subjected to full-wave rectification which becomes an input of the PFC circuit PFC in FIG. 22, the magnitude of the DC power supply potential Vdc, or the like. Although a set of the controller CTLU and the AD conversion circuit ADC is illustrated here, in practice, a plurality of sets of the controllers CTLU and the AD conversion circuits ADC are provided according the number of control objects.

Figure 24:
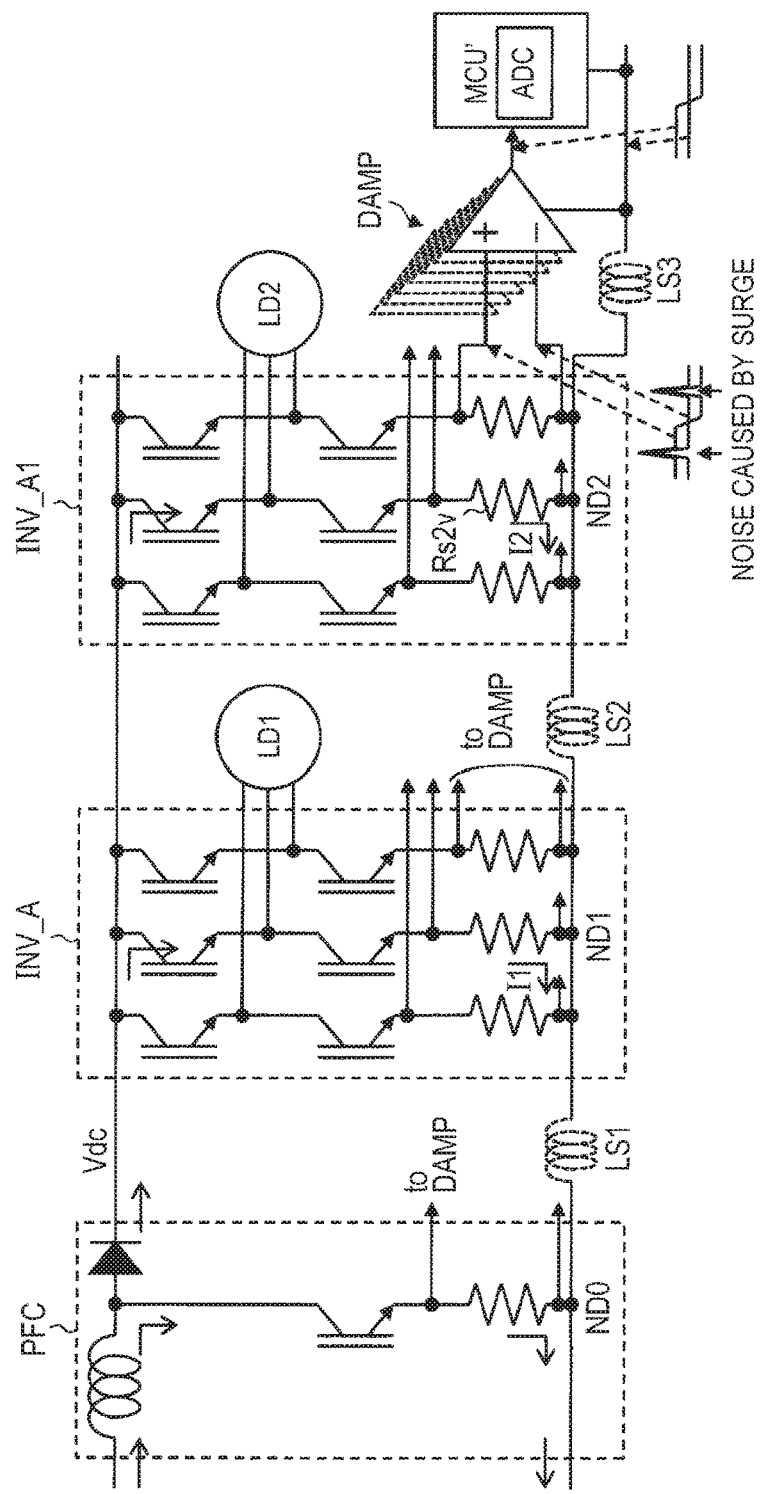
FIG. 24 is a schematic diagram illustrating an example of a current detecting method as a first comparative example in a switching system of FIG. 22.

FIG. 24 is a schematic diagram illustrating an example of a current detecting method as a first comparative example in the switching system of FIG. 22. To improve the current detection precision, a method of providing a differential amplification circuit DAMP amplifying the difference between voltages at both ends of each shunt resistor as illustrated in FIG. 24 is considered. In the example of FIG. 24, the grounding power supply potential GND of the microcontroller MCU' and the differential amplification circuit DAMP is coupled to the node ND2 via a floating inductance LS3.

In this case, for example, when the potential of one end (node ND2) of a shunt resistor Rs2$v$ fluctuates only by "LS3·d(I2)/dt" using the grounding power supply potential GND as a reference in association with a current value I2 of the 3-shunt inverter circuit INV_A1, the potential of the other end of the shunt resistor Rs2$v$ also fluctuates in the same manner. When it is amplified by the differential amplification circuit DAMP, the fluctuation amount is removed as an in-phase component, only the voltage across the terminals of the shunt resistor Rs2$v$ (current value I2×shunt resistance value) is amplified, and the amplified voltage is output to the AD conversion circuit ADC of the microcontroller MCU'.

By providing the differential amplification circuit DAMP as described above, the influence of the relative potential fluctuations of the nodes ND0, ND1, and ND3 can be cancelled substantially. However, since the differential amplification circuit DAMP is usually an external part, increase in the mounting area, increase in cost, and the like accompanying it are concerned. Further, when the fluctuation range of the grounding power supply potential GND exceeds a linear operation range of the differential amplification circuit DAMP, the current detection precision cannot be improved.

Figure 25:
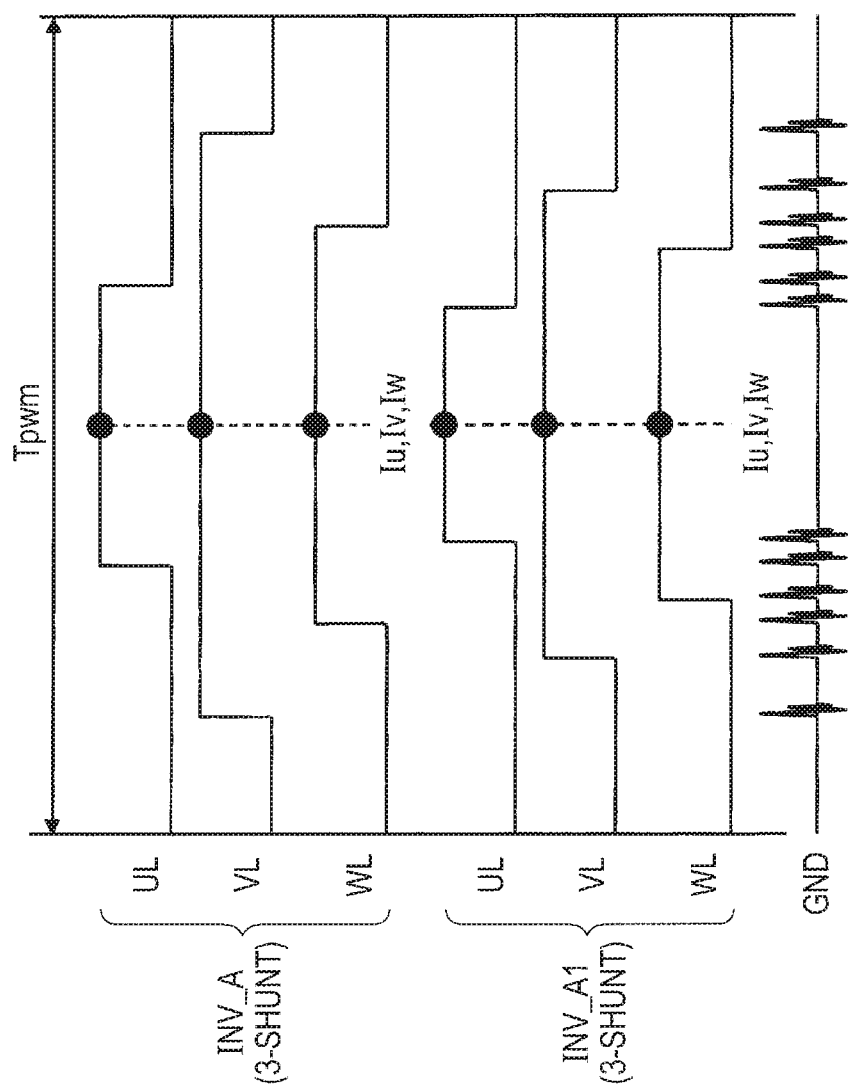
FIG. 25 is a timing chart illustrating an example of a current detecting method as a second comparative example in the switching system of FIG. 22.

FIG. 25 is a timing chart illustrating an example of a current detecting method as a second comparative example in the switching system of FIG. 22. In FIG. 25, in the two 3-shunt inverter circuits INV_A and INV_A1, the same PWM cycle Tpwm is set, and AD conversion is performed at the peak of a count value of a triangular-wave shape (that is, the center of the PWM cycle Tpwm). That is, in the two 3-shunt inverter circuits INV_A and INV_A1, current detection is performed at a timing around the center of a period in which all of the low-side transistors TRlu, TRlv, and TRlw of three phases are on.

In this case, edges of the PWM signals (gate control signals UL, VL, and WL) do not exit around the timings when current detection is performed, so that large fluctuation (dI/dt) does not occur in the current flowing in the 3-shunt inverter circuits INV_A and INV_A1. As a result, ground noise accompanying the above-described floating inductance can be substantially ignored at the timings when current detection is performed, so that current detection can be performed with high precision.

Figure 26:
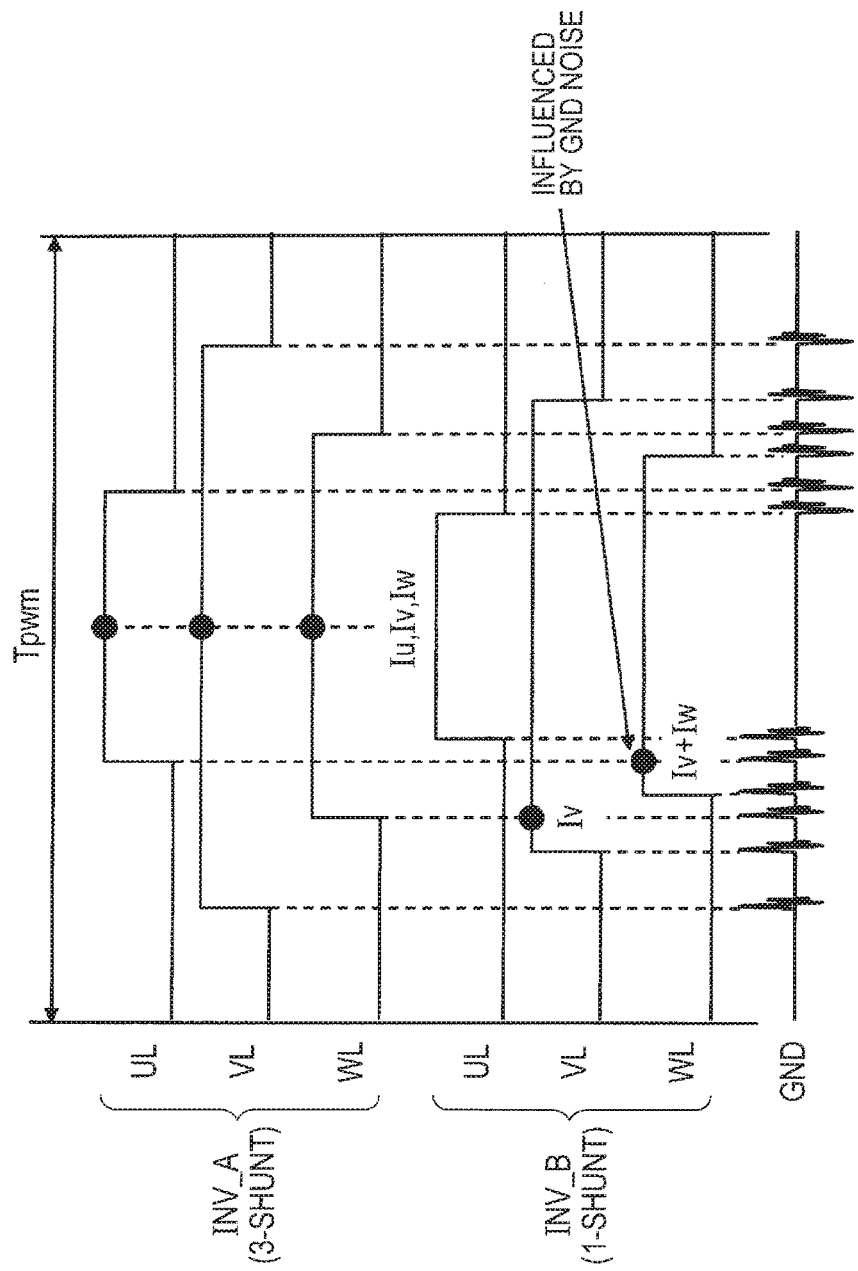
FIG. 26 is a timing chart illustrating an example of problems in the current detecting method of FIG. 25.

FIG. 26 is a timing chart illustrating an example of problems in the current detecting method of FIG. 25. The method of FIG. 25 can be applied to a system constructed by a 3-shunt inverter circuit and a PFC circuit but it is difficult to apply the method to a system including one or more 1-shunt inverter circuits INV_B as illustrated in FIG. 1. When the 1-shunt inverter circuit INV_B is used, the number of shunt resistors can be reduced as compared with the case of using a 3-shunt inverter circuit, so that it is advantageous from the points of reduction in the size and cost of the system and the like.

In FIG. 26, in the 3-shunt inverter circuit INV_A and the 1-shunt inverter circuit INV_B, the same PWM cycle Tpwm is set. In the 3-shunt inverter circuit INV_A, in a manner similar to the case of FIG. 25, sampling timings are set around the center of the PWM cycle Tpwm. On the other hand, in the 1-shunt inverter circuit INV_B, as described with reference to FIG. 2, the sampling timing is set around an intermediate point of rising edges of the gate control signals UL, VL, and WL of three phases. In the example of FIG. 26, the current value Iv of the v phase is sampled at an intermediate point between the rising edge of the gate control signal VL and the rising edge of the gate control signal WL, and a total current value of the current value Iv of the v phase and the current value Iw of the w phase at an intermediate point between the rising edge of the gate control signal WL and the rising edge of the gate control signal UL.

If the interval between a sampling timing (for example, the sampling timing of Iv) and a rising edge (for example, the rising edge of VL) is too narrow, ground noise is superimposed on the grounding power supply potential GND by a current change in the 1-shunt inverter circuit INV_B accompanying the edge, and current detection precision deteriorates. Therefore, the current detection timing is desirably set an intermediate point between edges. When the interval of adjacent edges is narrow and a sufficient interval cannot be assured even by setting the sampling timing around an intermediate point of the edges, it is sufficient to shift the edge of a predetermined PWM signal while maintaining duty.

When a system is constructed only by one 1-shunt inverter circuit INV_B by setting the sampling timing of the 1-shunt inverter circuit INV_B as described above, the current detection can be performed with high precision. However, when the system further includes another switching circuit, it is feared that the ground noise accompanying switching of the another switching circuit is superimposed on the grounding power supply potential GND at the sampling timing of the 1-shunt inverter circuit INV_B.

For example, in the example of FIG. 26, the w phase and the u phase of the 3-shunt inverter circuit INV_A are switched at the sampling timings of the current values Iv and "Iv+Iw" in the 1-shunt inverter circuit INV_B, respectively. Due to ground noise accompanying the switching, it may become difficult for the microcontroller MCU' to detect the current values Iv and "Iv+Iw" at high precision.

Japanese Unexamined Patent Application Publication No. 2012-80740 describes that while operating a PFC circuit and an inverter circuit at the same time, when the sampling timing of one of the PFC circuit and the inverter circuit and the switching timing of the other circuit overlap, either the sampling timing or the switching timing is shifted. A determination criterion of a timing and a concrete procedure of shifting are not described. Particularly, when the PFC circuit is of the interleave type, many sampling timings and many switching timings exist in the PWM cycle. There is consequently the possibility that a simple procedure of making a shift when the timings overlap is insufficient.

Schematic Configuration and Schematic Operation of Main Part of Microcontroller

Figure 3:
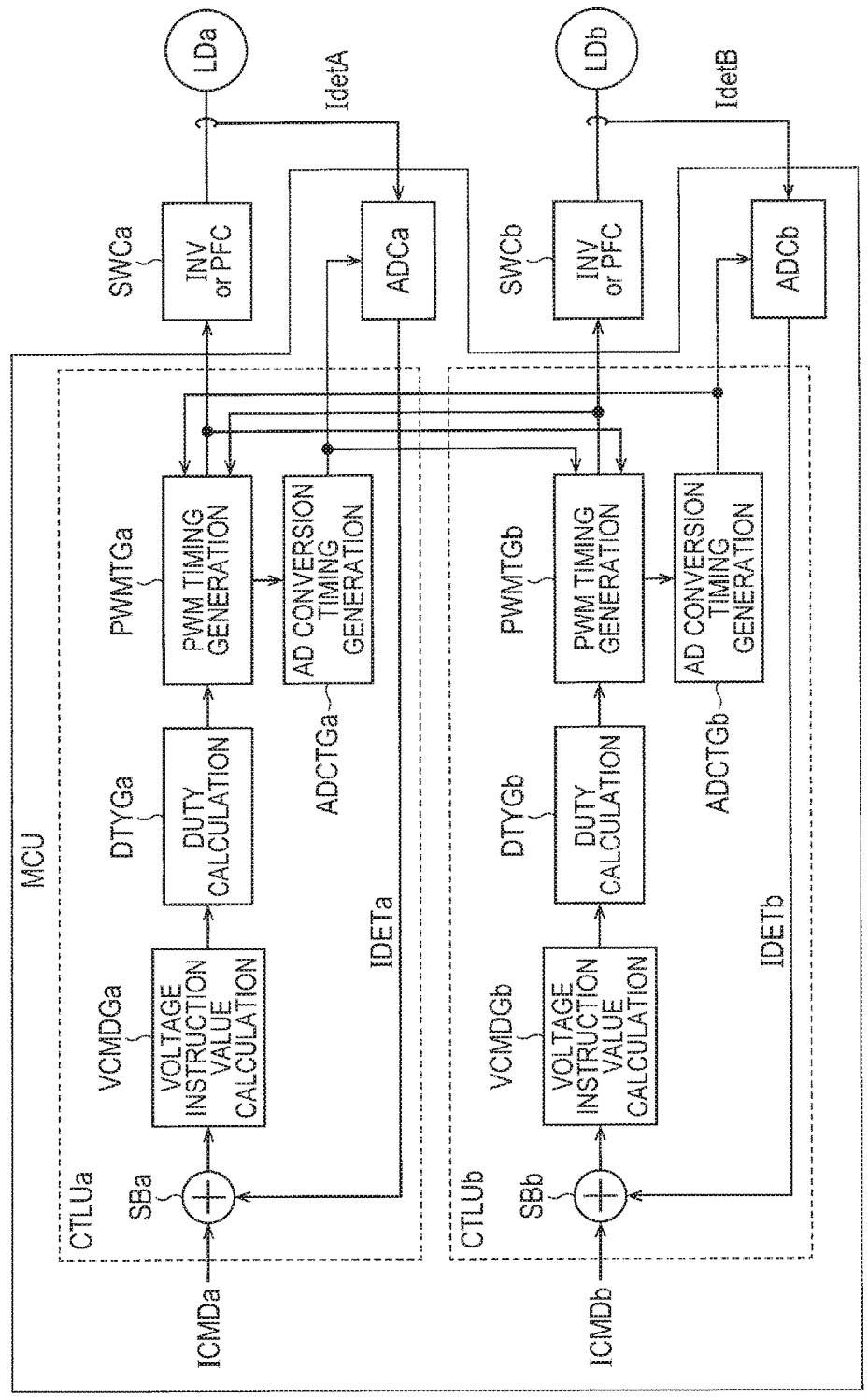
FIG. 3 is a schematic diagram illustrating a configuration example of a main part of a microcontroller in FIG. 1.

FIG. 3 is a schematic diagram illustrating a configuration example of a main part of the microcontroller in FIG. 1. The microcontroller MCU illustrated in FIG. 3 has two sets each made by the controller CTLU and the AD conversion circuit ADC illustrated in FIG. 23. An AD conversion circuit ADCa in the first set converts a detection current signal IdetA from the shunt resistor in a switching circuit SWCa supplying power to a load device LDa to a digital value IDETa on the basis of an AD conversion timing from an AD conversion timing generation circuit ADCTGa. The controller CTLUa of the first set generates a PWM signal in which the digital value IDETa is reflected and drives a switching transistor in the switching circuit SWCa.

Similarly, an AD conversion circuit ADCb in the second set converts a detection current signal IdetB from the shunt resistor in a switching circuit SWCb supplying power to a load device LDb to a digital value IDETb on the basis of an AD conversion timing from an AD conversion timing generation circuit ADCTGb. The controller CTLUb of the second set generates a PWM signal in which the digital value IDETb is reflected and drives a switching transistor in the switching circuit SWCb.

In FIG. 3, different from the case of FIG. 23, the PWM timing generation circuit PWMTGa in the controller CTLUa generates an edge timing of a PWM signal of a single phase or plural phases by using a count value of a triangle-wave shape generated internally and a comparison value from a duty calculation circuit DTYGa and, in addition, information from the controller CTLUb. Concretely, the PWM timing generation circuit PWMTGa generates an edge timing by using the edge timing from the PWM timing generation circuit PWMTGb and/or the AD conversion timing (sampling timing) from the AD conversion timing generation circuit ADCTGb. The AD conversion timing generation circuit ADCTGa generates the AD conversion timing of the AD conversion circuit ADCa on the basis of the edge timing.

Similarly, the PWM timing generation circuit PWMTGb in the controller CTLUb generates an edge timing of a PWM signal of a single phase or plural phases by using a count value of a triangle-wave shape generated internally and a comparison value from a duty calculation circuit DTYGb and, in addition, information from the controller CTLUa. Concretely, the PWM timing generation circuit PWMTGb generates an edge timing by using the edge timing from the PWM timing generation circuit PWMTGa and/or the AD conversion timing (sampling timing) from the AD conversion timing generation circuit ADCTGa. The AD conversion timing generation circuit ADCTGb generates the AD conversion timing of the AD conversion circuit ADCb on the basis of the edge timing.

Each of the switching circuits SWCa and SWCb is the inverter circuit INV or the PFC circuit PFC. At least one of the switching circuits SWCa and SWCb is the 1-shunt inverter circuit (the inverter circuit of the common shunt type) INV_B in FIG. 1. Although the details will not be described, the count value of the triangle-wave shape used in the PWM timing generation circuit PWMTGa and the count value of the triangle-wave shape used in the PWM timing generation circuit PWMTGb have a relation of the same frequency or the integral multiple of frequencies, and the timings when the count values become the maximum value (in other words, the peak) or the minimum value (in other words, the bottom) are synchronized. That is, the peaks are synchronized, the bottoms are synchronized, or the peak and the bottom are synchronized. When the frequencies of the count values are the same, the count value generated one of the PWM timing generation circuits PWMTGa and PWMTGb may be used in the other circuit.

Timing Generating Method [1a]

Figure 4:
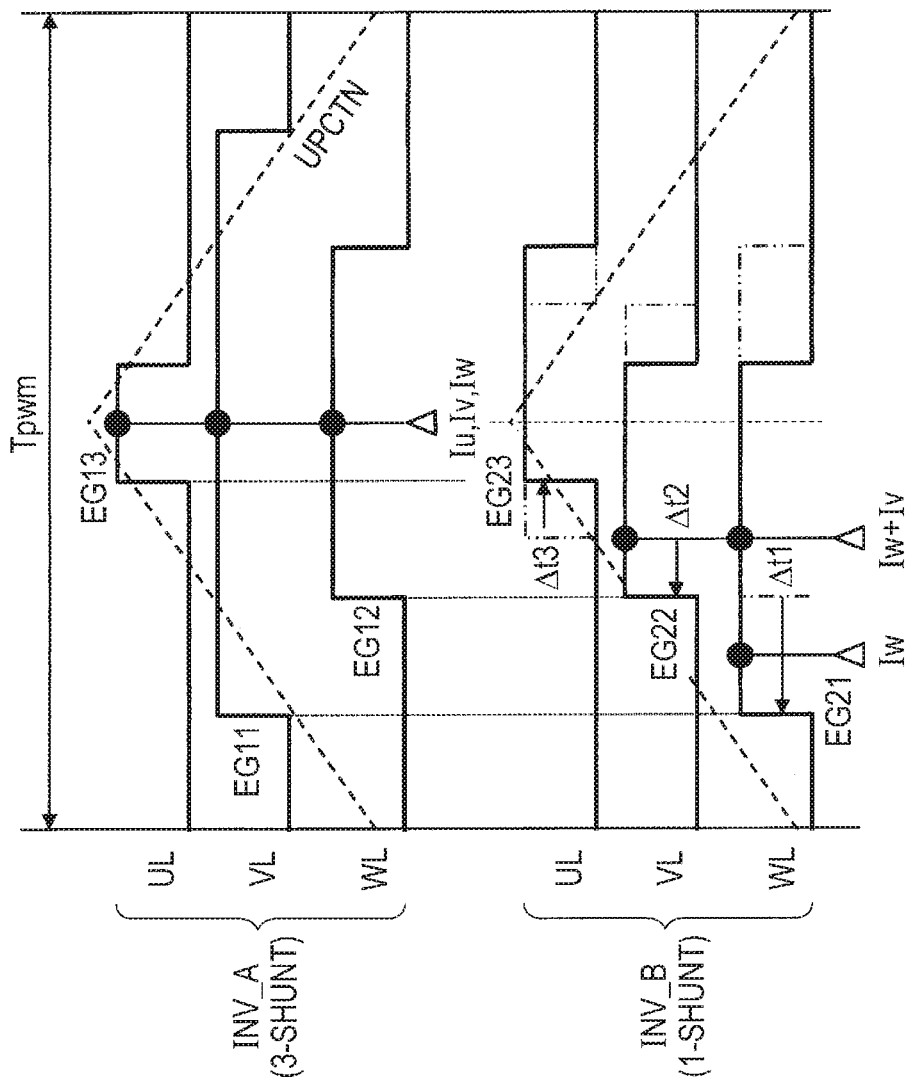
FIG. 4 is a timing chart illustrating a concrete example when a controller in FIG. 3 generates timings by using a first timing generating method.
Figure 5:
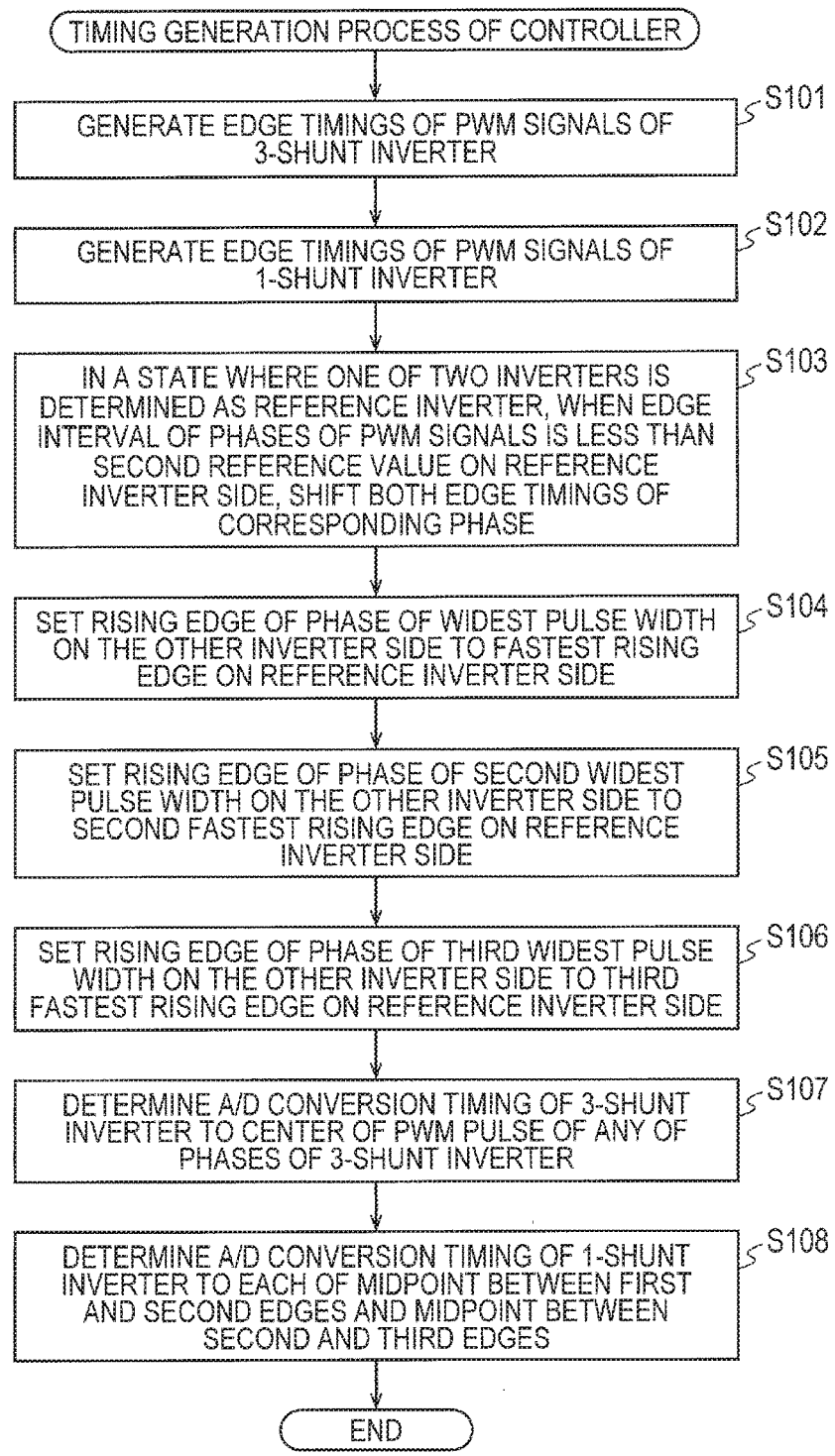
FIG. 5 is a flowchart illustrating an example of processes of the controller in FIG. 3 based on the timing generating method of FIG. 4.

FIG. 4 is a timing chart illustrating a concrete example when a controller in FIG. 3 generates timings by using a first timing generating method. FIG. 5 is a flowchart illustrating an example of processes of the controller in FIG. 3 based on the timing generating method of FIG. 4. Outline of the first timing generating method is as follows as illustrated in FIGS. 4 and 5. First, the PWM timing generation circuits PWMTGa and PWMTGb generate edge timings of PWM signals every PWM cycle. After that, one of the PWM timing generation circuits PWMTGa and PWMTGb shifts the generated edge timing so as to be synchronized with the edge timing generated by the other circuit.

In the example of FIG. 4, the controller CTLUa generates the edge timing and AD conversion timing of the 3-shunt inverter circuit INV_A, and the controller CTLUb generates the edge timing and the AD conversion timing of the 1-shunt inverter circuit INV_B. In the 3-shunt inverter circuit INV_A, the PWM timing generation circuit PWMTGa compares a count value UPCTN of a triangle-wave shape based on an up-down counter and each of comparison values of phases (three phases) supplied, thereby generating edge timings of the gate control signals (PWM signals) UL, VL, and WL. In the method using such a count value UPCTN of the triangle-wave shape, in each phase, the rising edge timing and the falling edge timing are determined in positions symmetrical with respect to the center of the PWM cycle (that is, the cycle of the count value UPCTN) Tpwm. The AD conversion timing generation circuit ADCTGa determines an AD conversion timing around the center of the PWM cycle Tpwm (in this case, the peak of the triangle wave).

In reality, an error may occur due to delay or the like between the AD conversion timing generated by the AD conversion timing generation circuit ADCTGa and the timing the AD conversion circuit ADCa actually executes AD conversion. The timing when the AD conversion circuit ADCa actually executes AD conversion does not always have to match the center of the PWM cycle Tpwm but may be around the center. Consequently, the AD conversion timing generated by the AD conversion timing generation circuit ADCTGa may be also around the center.

After generating the edge timings of the phases, if the interval of rising edge timings EG11, EG12, and EG13 adjacent in each phase is less than a second reference value (for example, 2 µs), the PWM timing generation circuit PWMTGa shifts both (rising and falling) edge timings of a corresponding phase so that the interval becomes the second reference value or larger. That is, since an object to be controlled of the PWM timing generation circuit PWMTGa is the 3-shunt inverter circuit INV_A, originally, such a shifting process is unnecessary, but the shifting process is performed in consideration of the AD conversion timing of the 1-shunt inverter circuit INV_B.

On the other hand, in the 1-shunt inverter circuit INV_B, the PWM timing generation circuit PWMTGb compares a predetermined count value and comparison values of the phases supplied, thereby generating edge timings of the gate control signals (PWM signals) UL, VL, and WL. The predetermined count value is either the count value UPCTN which is the same count value UPCTN used in the PWM timing generation circuit PWMTGa or a count value of a triangle-wave shape having the same frequency as the count value UPCTN and synchronized with the count value UPCTN at the peak or bottom timing. For example, the PWM timing generation circuit PWMTGb may use the count value UPCTN generated by the PWM timing generation circuit PWMTGa commonly or generate the count value separately or, in some cases, generate a count value whose count direction (up direction or down direction) is opposite to that of the count value of the PWM timing generation circuit PWMTGa.

The PWM timing generation circuit PWMTGb shifts generated rising edge timings EG21, EG22, and EG23 so as to be synchronous with the rising edge timings EG11, EG12, and EG13 generated by the PWM timing generation circuit PWMTGa. At this time, the PWM timing generation circuit PWMTGb shifts the generated rising edge timings EG21, EG22, and EG23 of the three phases so that a phase having a wider pulse width is assigned to an earlier timing in the rising edge timings EG11, EG12, and EG13.

In the example of FIG. 4, the PWM timing generation circuit PWMTGb advances the rising edge timing EG21 of the w phase having the widest pulse width only by Δt1 so as to be synchronous with the earliest edge timing EG11. The PWM timing generation circuit PWMTGb advances the rising edge timing EG22 of the v phase having the second widest pulse width only by Δt2 so as to be synchronous with the second earliest edge timing EG12. Similarly, the PWM timing generation circuit PWMTGb delays the rising edge timing EG23 of the u phase having the third widest pulse width only by Δt3 so as to be synchronous with the third earliest edge timing EG13.

The AD conversion timing generation circuit ADCTGb determines the AD conversion timing (sampling timing) of detecting the current value Iw at around an intermediate point between the edge timings EG21 and EG22 and determines the AD conversion timing of detecting the current value "Iw+Iv" at around an intermediate point between the edge timings EG22 and EG23. At this time, since the second reference value (for example, 2 μs) or larger is assured as the interval of adjacent edges in the edge timings EG11, EG12, and EG13 as described above, the first reference value (for example, 1 μs) or larger can be assured as the interval between each of the AD conversion timings and the adjacent edge timing. The first reference value is, for example, the minimum interval that the influence of ground noise accompanying the edge timing exerted on the AD conversion can be ignored, and the second reference value is, for example, an interval which is twice of the minimum interval or more.

The controllers CTLUa and CTLUb in FIG. 3 execute a flow as illustrated in FIG. 5 in accordance with the timing generating method as illustrated in FIG. 4. The controllers CTLUa and CTLUb are mounted, for example, to mainly perform a program process or the like by a processor, and the flow of FIG. 5 is executed only by the program process. In FIG. 5, the PWM timing generation circuit PWMTGa generates an edge timing of the PWM signal of the 3-shunt inverter circuit INV_A (step S101), and the PWM timing generation circuit PWMTGb generates an edge timing of the PWM signal of the 1-shunt inverter circuit INV_B (step S102).

Subsequently, in a state where one of the 3-shunt inverter circuit INV_A and the 1-shunt inverter circuit INV_B (in the example of FIG. 4, the 3-shunt inverter circuit INV_A) is determined as a reference inverter, the PWM timing generation circuit PWMTGa on the reference inverter side executes the process of step S103. That is, when the edge interval of phases of the PWM signals generated in step S101 is less than the second reference value, the PWM timing generation circuit PWMTGa shifts both edge timings of the corresponding phase so that the edge interval becomes equal to or larger than the second reference value (step S103).

Subsequently, the PWM timing generation circuit PWMTGb on the other inverter (in the example of FIG. 4, the 1-shunt inverter circuit INV_B) side shifts the rising edge (EG21) of the phase having the widest pulse width in the PWM signals of the three phases generated in step S102 so as to be synchronous with the earliest rising edge (EG11) on the reference inverter side (step S104). The PWM timing generation circuit PWMTGb shifts the rising edge (EG22) of the phase having the second widest pulse width so as to be synchronous with the second earliest rising edge (EG12), and shifts the rising edge (EG23) of the third widest phase so as to be synchronous with the third earliest rising edge (EG13) (steps S105 and S106).

The AD conversion timing generation circuit ADCTGa in the 3-shunt inverter circuit INV_A determines the AD conversion timing at around the center of the pulse of any of the phases of the generated PWM signals (step S107). The AD conversion timing generation circuit ADCTGb in the 1-shunt inverter circuit INV_B determines the AD conversion timing at around an intermediate point between the first rising edge (EG21) and the second rising edge (EG22) and around an intermediate point between the second rising edge (EG22) and the third rising edge (EG23) (step S108).

In step S107, in the PWM cycle Tpwm as illustrated in FIG. 4, the process of step S103 is unnecessary. However, in the case of the PWM cycle in which the process of step S103 is necessary, the AD conversion timing is not always good at the center of the PWM cycle. In the process of step S103, for example, in a state where the second earliest edge timing (in other words, the phase having the second widest pulse width) is fixed, the earliest edge timing (the phase having the widest pulse width) is advanced or the third earliest edge timing (the phase having the third widest pulse width) is delayed, thereby assuring the edge interval. In this case, it is sufficient to determine the AD conversion timing, for example, at around the center of the phase having the third widest pulse width.

Although the method of adjustment to the rising edge timing has been described with reference to FIGS. 4 and 5, similarly, a method of adjustment to the falling edge timings may be used. In this case, as the falling edge timings of the phases in the 1-shunt inverter circuit INV_B, a phase having a wider pulse width is assigned to a later timing in the falling edge timings in the 3-shunt inverter circuit INV_A. The AD conversion timing is set at around an intermediate point of the falling edge timings of the phases in the 1-shunt inverter circuit INV_B. In the following embodiments, the case of setting the AD conversion timing of the 1-shunt inverter circuit INV_B to the rising edge side will be described as an example. Unless otherwise mentioned, the case can be replaced to the case of setting the AD conversion timing to the falling edge side.

Figure 6:
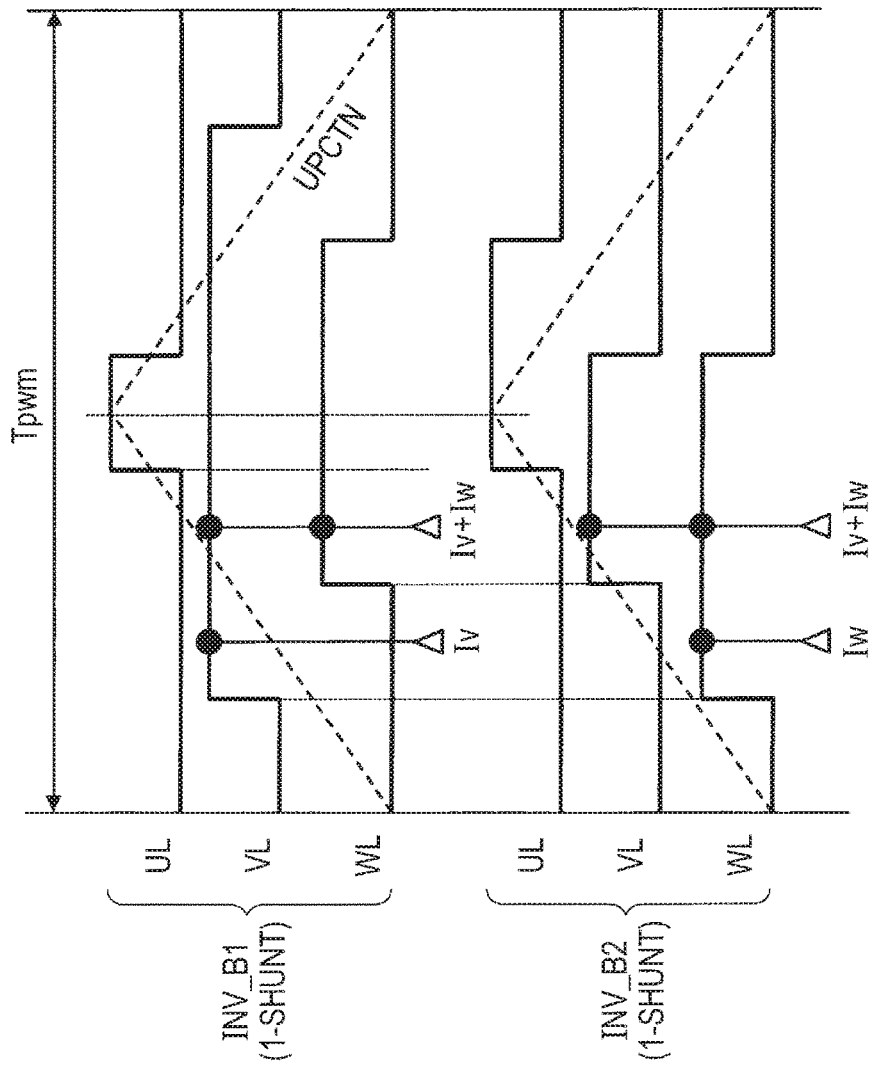
FIG. 6 is a timing chart illustrating another concrete example when the controller in FIG. 3 generates timings by using the first timing generating method.

FIG. 6 is a timing chart illustrating another concrete example when the controller in FIG. 3 generates timings by using the first timing generating method. In the example of FIG. 6, the controller CTLUa generates the edge timing and AD conversion timing of the 1-shunt inverter circuit INV_B1, and the controller CTLUb generates the edge timing and the AD conversion timing of another 1-shunt inverter circuit INV_B2. In this case as well, like the case of FIG. 4, by assuring the second reference value or larger as each of edge intervals by the inverter circuit on the reference side (the reference inverter in FIG. 5), the first reference value or larger can be assured as the interval between each of the AD conversion timings and the edge timing adjacent to it.

When both two objects to be controlled are the 1-shunt inverter circuits INV_B1 and INV_B2 like the case of FIG. 6, the reference inverter in FIG. 5 may be any of the 1-shunt inverter circuits. When objects to be controlled are the 3-shunt inverter circuit INV_A and the 1-shunt inverter circuit INV_B like the case of FIG. 4, the reference inverter in FIG. 5 is desirably the 3-shunt inverter circuit INV_A. The reason is that when the edge timing of the 3-shunt inverter circuit INV_A is shifted largely, it becomes difficult to determine the AD conversion timing of the 3-shunt inverter circuit INV_A.

Figure 7:
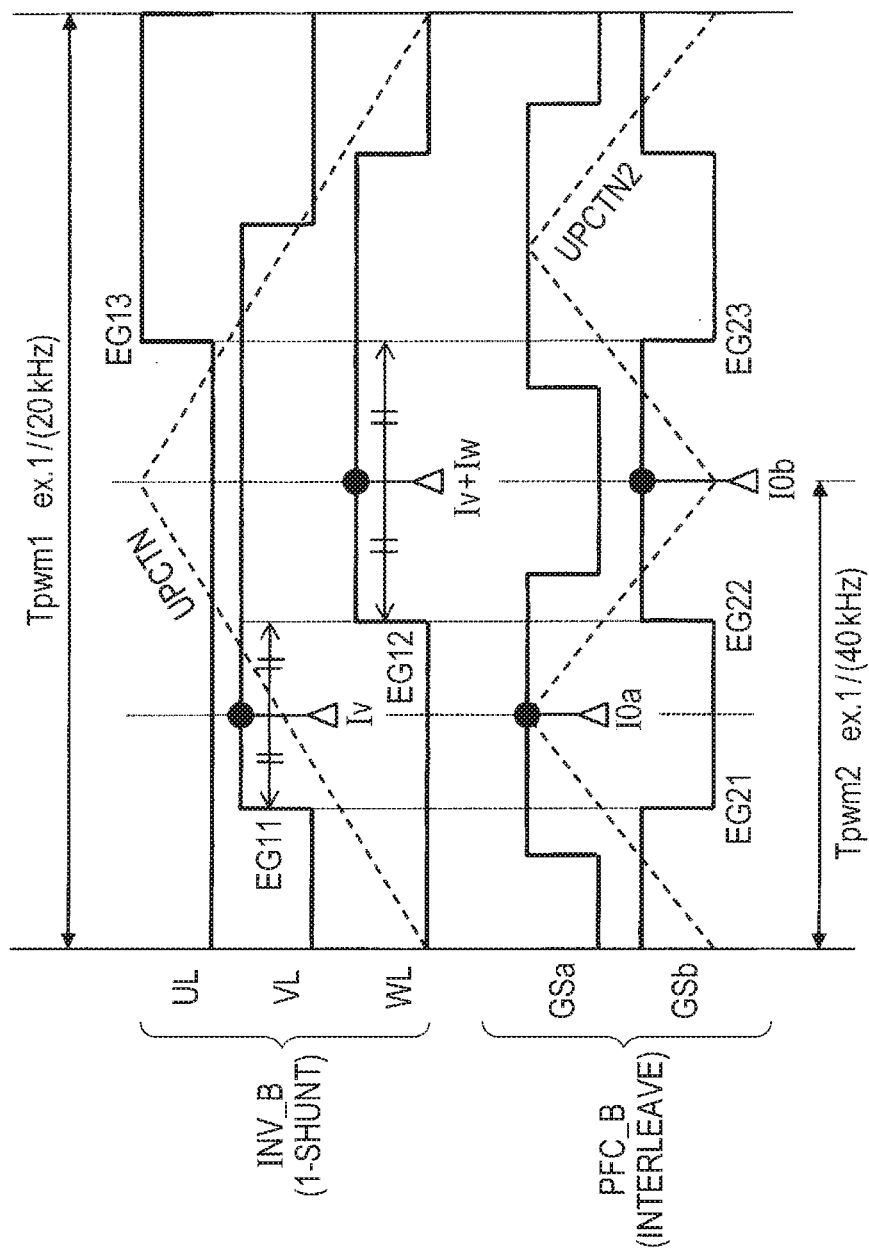
FIG. 7 is a timing chart illustrating further another concrete example when the controller in FIG. 3 generates timings by using the first timing generating method.
Figure 8:
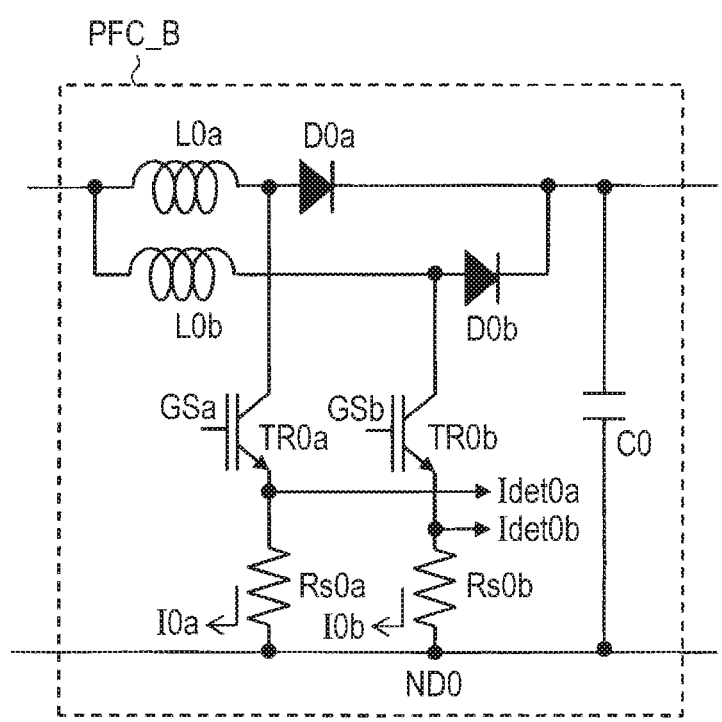
FIG. 8 is a circuit diagram illustrating a configuration example of a PFC circuit of an interleave type in FIG. 7.

FIG. 7 is a timing chart illustrating further another concrete example when the controller in FIG. 3 generates timings by using the first timing generating method. FIG. 8 is a circuit diagram illustrating a configuration example of a PFC circuit of an interleave type in FIG. 7. In the example of FIG. 7, the controller CTLUa generates the edge timing and the AD conversion timing of the 1-shunt inverter circuit INV_B, and the controller CTLUb generates the edge timing and the AD conversion timing of the PFC circuit PFC_B of the interleave type.

In a switching system, there is a case that a PFC circuit PFC_B of the interleave type is used in place of the PFC circuit PFC illustrated in FIG. 1 to reduce ripple current or the like. As illustrated in FIG. 8, the PFC circuit PFC_B of the interleave type has two sets of the inductors L0, the diodes D0, the switching transistors TR0, and the shunt resistors Rs0 (inductors L0a and L02, diodes D0a and D0b, switching transistors TR0a and TR0b, and shunt resistors Rs0a and Rs0b). The switching transistors TR0a and TR0b are alternately driven by gate control signals (PWM signals) GSa and GSb of two phases.

For example, as illustrated in FIG. 7, at the frequency twice as high as that of the count value UPCTN of the triangle-wave shape used in the PWM timing generation circuit PWMTGa, the PWM timing generation circuit PWMTGb on the PFC circuit PFC_B side generates the gate control signals GSa and GSb of two phases by using the count value UPCNN2 of the triangle-wave shape whose bottom is synchronous with the peak of the count value UPCTN. The count value UPCTN2 of the triangle-wave shape is generated by, for example, the up-down counter. For example, the PWM cycle Tpwm1 of the count value UPCTN of the triangle-wave shape used in the PWM timing generation circuit PWMTGa is 1/(20 kHz), and the PWM cycle Tpwm2 of the count value UPCTN2 of the triangle-wave shape used in the PWM timing generation circuit PWMTGb is 1/(40 kHz).

The AD conversion timing generation circuit ADCTGb on the PFC circuit PFC_B side determines the AD conversion timing of the phase as one of the two phases (in this case, the gate control signal GSa side) using the timing at the peak of the count value UPCTN2 of the triangle-wave shape as a reference. The AD conversion timing generation circuit ADCTGb determines the AD conversion timing of the other phase (in this case, the gate control signal GSb side) using the timing at the bottom of the count value UPCTN2 of the triangle-wave shape as a reference.

As described above, when the switching system includes the PFC circuit PFC_B of the interleave type and the 1-shunt inverter circuit INV_B, it is sufficient to generate the edge timing of the 1-shunt inverter circuit INV_B using the PFC circuit PFC_B as the reference inverter in FIG. 5. In the PFC circuit PFC_B, the gate control signals GSa and GSb whose duty changes every PWM cycle are used. Usually, the interval of adjacent edges sandwiching the AD conversion timing is maintained at the second reference value (for example, 2 µs) or larger. Specifically, in FIG. 7, the interval between the falling edge timing EG21 and the rising edge timing EG22 of the gate control signal GSb and the interval between the rising edge timing EG22 and the falling edge timing EG23 are maintained at the second reference value or larger. The gate control signal GSa is similar.

As illustrated in FIG. 7, the PWM timing generation circuit PWMTGa on the 1-shunt inverter circuit INV_B side synchronizes the edge timings of the gate control signals (PWM signals) UL, VL, and WL of the phases with the edge timings of the gate control signal GSa or GSb (in the example of FIG. 7, GSb). In a manner similar to the case of FIG. 4 or the like, as the edge timing, the pulse width having a wider phase is assigned to the earlier timing. In the example of FIG. 7, the pulse width is wider in descending order of the v phase, the w phase, and the u phase, and rising edge timings EG11, EG12, and EG13 are assigned to the edge timings EG21, EG22, and EG23, respectively, of the PFC circuit PFC_B.

Timing Generating Method [1b]

Figure 9:
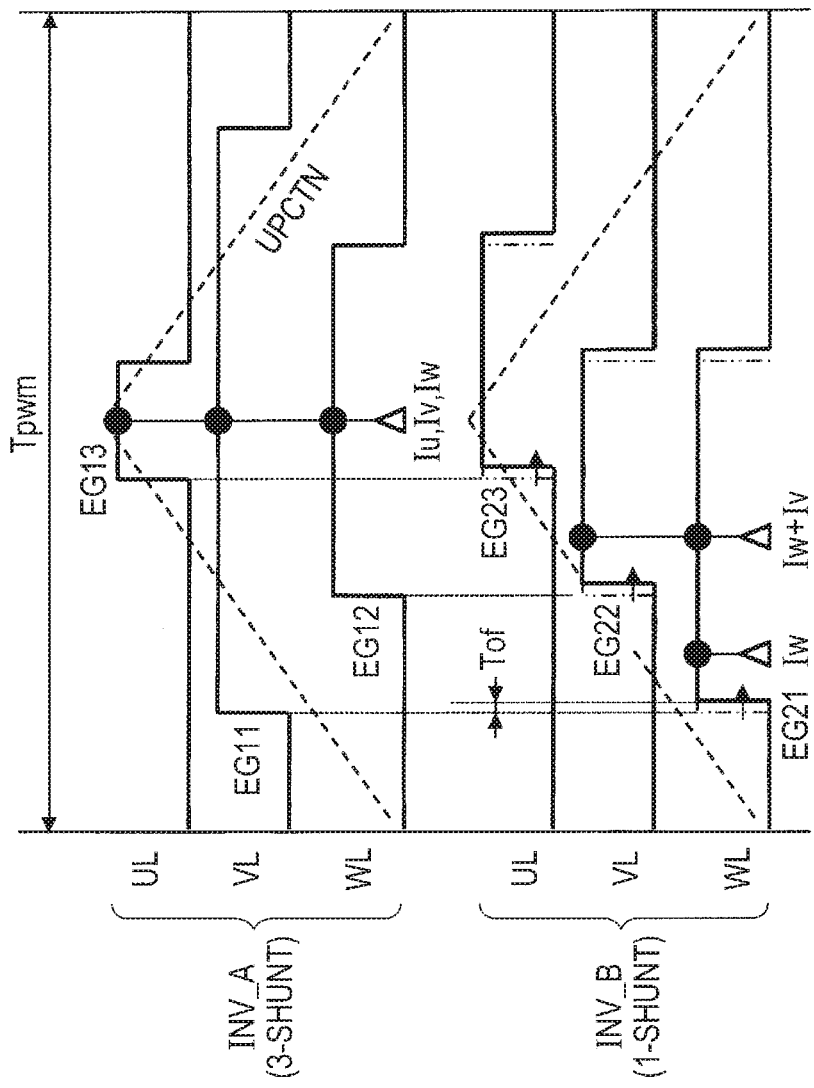
FIG. 9 is a timing chart illustrating an application example of the timing generating method of FIG. 4.

FIG. 9 is a timing chart illustrating an application example of the timing generating method of FIG. 4. In FIG. 9, a timing chart substantially similar to that of FIG. 4 is illustrated. Different from FIG. 4, the PWM timing generation circuit PWMTGb on the 1-shunt inverter circuit INV_B side determines the rising edge timings in the PWM signal of three phases not to the same as the rising edge timing in the 3-shunt inverter circuit INV_A but so as to be deviated only by a predetermined fixed offset value every PWM cycle Tpwm. In the example of FIG. 9, the rising edge timings EG21, EG22, and EG23 in the gate control signals (PWM signals) WL, VL, and UL of the three phases are determined so as to be deviated from the rising edge timings EG11, EG12, and EG13 only by, for example, an offset value Tof of ±a few µs, respectively.

When the first timing generating method is used, a plurality of switching circuits switch at the same time at the edge timings. In this case, large switching noise occurs and, accompanying it, power supply noise occurs in the circuits in the switching system. There is consequently the possibility that erroneous operation occurs in the circuits. To reduce the switching noise, it is useful to perform an offset process based on the fixed offset value Tof. In the case of performing the offset process, the above-described first and second reference values are set to values each including a margin based on the fixed offset value Tof.

Main Effects of First Embodiment

By using the method of the first embodiment as described above, representatively, the precision of current detection can be improved in a switching system having a plurality of switching circuits. In this case, additional circuits such as the differential amplification circuit DAMP as illustrated in FIG. 24 are not necessary. Different from the case of FIG. 25, the plurality of switching circuits may be constructed by any of a 1-shunt inverter circuit, a 3-shunt inverter circuit, or a PFC circuit. Consequently, current detection with high precision at low cost can be realized for various combinations of switching circuits.

For example, although the 1-shunt inverter circuit INV_B is combined with the PFC circuit PFC_B of the interleave type in which timing relations are complicated in FIG. 7, a similar method can be applied also to a case of combining the 1-shunt inverter circuit INV_B to a PFC circuit PFC of the single phase as illustrated in FIG. 1. In this case, for example, it is sufficient to synchronize any of the rising edges of the phases in the 1-shunt inverter circuit INV_B with the rising edge of the gate control signal GS of the single phase in the PFC circuit PFC.

Although there is an exception, for example, each of duties of the PWM signals of three phases in the inverter circuits in FIG. 4 is basically controlled to a value so that an average value of the duties of the three phases becomes 50% every PWM cycle Tpwm. Under such situation, as described with reference to FIG. 4 or the like, by associating the descending order of the pulse widths and the descending order of the timings, for example, a situation such that the falling edge timing of the PWM signal (WL) of the phase having the widest pulse width (the w phase in INV_B in FIG. 4) deviates from the PWM cycle Tpwm does not easily occur. For example, a situation such that the falling edge timing of the PWM signal of each of the phases of the 1-shunt inverter circuit INV_B interferes the AD conversion timing of the 3-shunt inverter circuit INV_A in FIG. 4 also does not occur easily.

For example, when the difference between duties of the phases on the reference inverter side described with reference to FIG. 5 is small (for example, around 50% in all of the phases) and the difference of duties in the phases in the inverter circuit on the side of synchronizing to the reference inverter side is large (for example, when duties of, for example, 90% and 10% are included), it is feared that the falling edge timing deviates from the PWM cycle Tpwm. Consequently, for example, when a combination of the 1-shunt inverter circuits is set as an object as illustrated in FIG. 6, in step S103 in FIG. 5, a process of replacing the reference inverter to determine, as a reference inverter, an inverter in which the difference of duties of the phases is larger may be performed every PWM cycle Tpwm. For a similar reason, when the PFC circuit of the interleave type is set as the reference inverter as illustrated in FIG. 8, every PWM cycle Tpwm, while properly selecting one of the gate control signals GSa and GSb, a process of synchronizing with the edge timing of the selected signal may be performed. Although the case of driving two switching circuits is described as an example here, the invention can be also similarly applied to three or more switching circuits.

Second Embodiment

Timing Generating Method [2]

Figure 10:
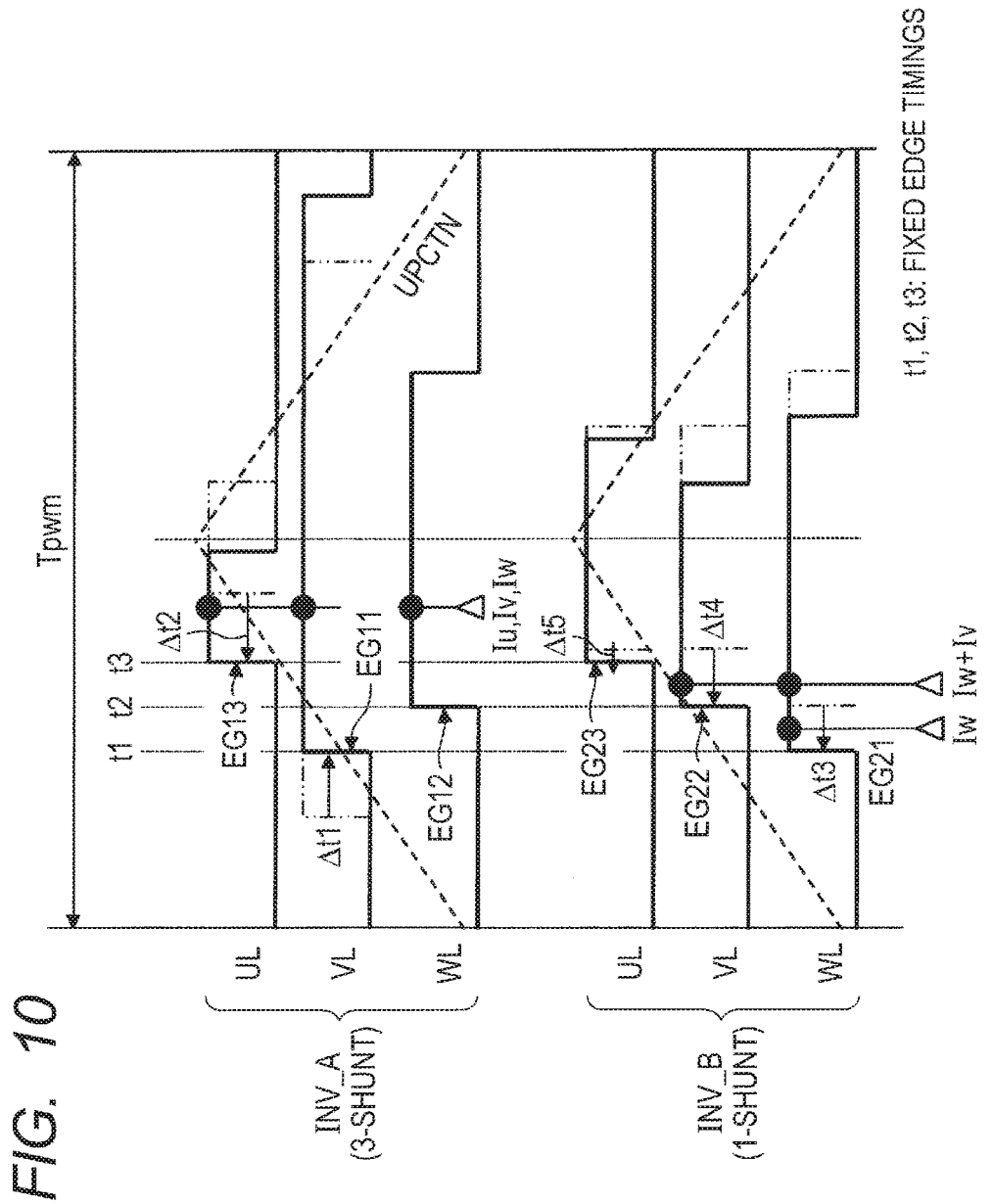
FIG. 10 is a timing chart illustrating a concrete example when the controller in FIG. 3 generates timings by using a second timing generating method in a switching system according to a second embodiment of the present invention.
Figure 11:
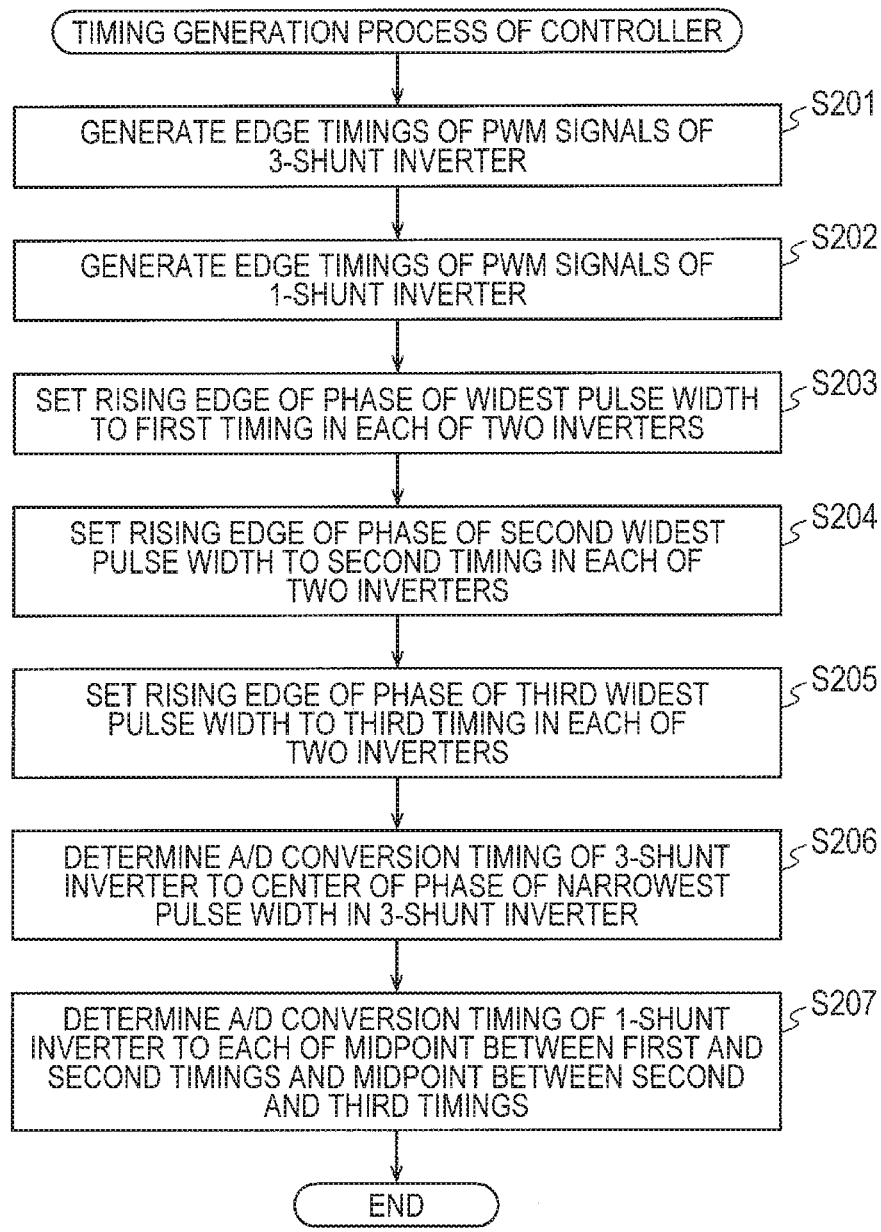
FIG. 11 is a flowchart illustrating an example of processes of the controller in FIG. 3 based on the timing generating method of FIG. 10.

FIG. 10 is a timing chart illustrating a concrete example when the controller in FIG. 3 generates timings by using a second timing generating method in a switching system according to a second embodiment of the present invention. FIG. 11 is a flowchart illustrating an example of processes of the controller in FIG. 3 based on the timing generating method of FIG. 10. Outline of the second timing generating method is as follows as illustrated in FIGS. 10 and 11. First, the PWM timing generation circuits PWMTGa and PWMTGb generate edge timings of PWM signals every PWM cycle. After that, at least one of the PWM timing generation circuits PWMTGa and PWMTGb shifts one of a rising edge timing and a falling edge timing generated so as to be synchronized with a fixed edge timing. The fixed edge timing is determined preliminarily as a timing common for the PWM cycles so that an interval between adjacent edges becomes equal to or larger than a second reference value.

In the example of FIG. 10, the controller CTLUa generates the edge timing and AD conversion timing of the 3-shunt inverter circuit INV_A, and the controller CTLUb generates the edge timing and the AD conversion timing of the 1-shunt inverter circuit INV_B. In a manner similar to the case of FIG. 4, each of the PWM timing generation circuits PWMTGa and PWMTGb generates the edge timings of the gate control signals (PWM signals) UL, VL, and WL on the basis of the count value UPCTN having a triangle-wave shape and each of comparison values of phases (three phases) supplied.

After that, the PWM timing generation circuit PWMTGa on the 3-shunt inverter circuit INV_A side shifts the generated rising edge timings EG11, EG12, and EG13 so as to be synchronized with fixed edge timings t1, t2, and t3, respectively. At this time, the PWM timing generation circuit PWMTGa shifts the generated rising edge timings EG11, EG12, and EG13 of the three phases so that the phase having a wider pulse width is assigned to an earlier timing in the fixed edge timings t1, t2, and t3.

In the example of FIG. 10, the PWM timing generation circuit PWMTGa delays the rising edge timing EG11 of the v phase having the widest pulse width only by Δt1 so as to be synchronous with the earliest fixed edge timing t1. The PWM timing generation circuit PWMTGa shifts the rising edge timing EG12 of the w phase having the second widest pulse width so as to be synchronous with the second earliest edge timing t2 (in this case, shift is unnecessary). Similarly, the PWM timing generation circuit PWMTGa advances the rising edge timing EG13 of the u phase having the third widest pulse width only by Δt2 so as to be synchronous with the third earliest fixed edge timing t3. The AD conversion timing generation circuit ADCTGa determines, for example, the AD conversion timing around the center of the pulse of the phase having the narrowest pulse width.

Similarly, the PWM timing generation circuit PWMTGb on the 1-shunt inverter circuit INV_B side also shifts the generated rising edge timings E21, E22, and EG23 so as to be synchronous with the fixed edge timings t1, t2, and t3, respectively. At this time, the PWM timing generation circuit PWMTGb shifts the generated rising edge timings EG21, EG22, and EG23 of the three phases only by Δt3, Δt4, and Δt5, respectively, so that the phases having wider pulse width are assigned to earlier fixed edge timings t1, t2, and t3. In the example of FIG. 10, the pulse width of the u phase and that of the v phase in the 1-shunt inverter circuit INV_B are the same and, in this case, proper ordering is performed.

The AD conversion timing generation circuit ADCTGb determines the AD conversion timing (sampling timing) for detecting the current value Iw at around an intermediate point between the edge timings EG21 and EG22 and the AD conversion timing for detecting the current value "Iw+Iv" at around an intermediate point between the edge timings EG22 and EG23. Since the second reference value (for example, 2 μs) or larger is preliminarily assured as the interval of adjacent edges at the fixed edge timings t1, t2, and t3 at this time, in a manner similar to the first embodiment, the first reference value (for example, 1 μs) or larger can be assured as the interval between each of the AD conversion timings and the edge timing adjacent to it. It is similar also in the case of replaying the 3-shunt inverter circuit INV_A in FIG. 10 with the 1-shunt inverter circuit.

The controllers CTLUa and CTLUb in FIG. 3 execute a flow as illustrated in FIG. 11 by the timing generating method as depicted in FIG. 10. In FIG. 11, the PWM timing generation circuit PWMTGa generates an edge timing of the PWM signal of the 3-shunt inverter circuit INV_A (step S201), and the PWM timing generation circuit PWMTGb generates an edge timing of the PWM signal of the 1-shunt inverter circuit INV_B (step S202).

Subsequently, the PWM timing generation circuits PWMTGa and PWMTGb shift the rising edges (EG11 and EG21) each of the phase having the widest pulse width in the PWM signals of three phases generated in steps S201 and S202, respectively, so as to be synchronized with the first fixed edge timing t1 (step S203). The PWM timing generation circuits PWMTGa and PWMTGb shift the rising edges (EG12 and EG22) each of the phase having the second widest pulse width, respectively, so as to be synchronized with the second fixed edge timing t2 (step S204). Similarly, the PWM timing generation circuits PWMTGa and PWMTGb shift the rising edges (EG13 and EG23) each of the phase having the third widest pulse width, respectively, so as to be synchronized with the third fixed edge timing t3 (step S205).

The AD conversion timing generation circuit ADCTGa on the 3-shunt inverter circuit INV_A side determines the AD conversion timing at around the center of the pulse of the phase having the narrowest pulse width in the generated PWM signals (step S206). On the other hand, the AD conversion timing generation circuit ADCTGb on the 1-shunt inverter circuit INV_B side determines the AD conversion timing at around an intermediate point between the first fixed edge timing t1 and the second fixed edge timing t2 and at around an intermediate point between the second fixed edge timing t2 and the third fixed edge timing t3 (step S207).

Figure 12:
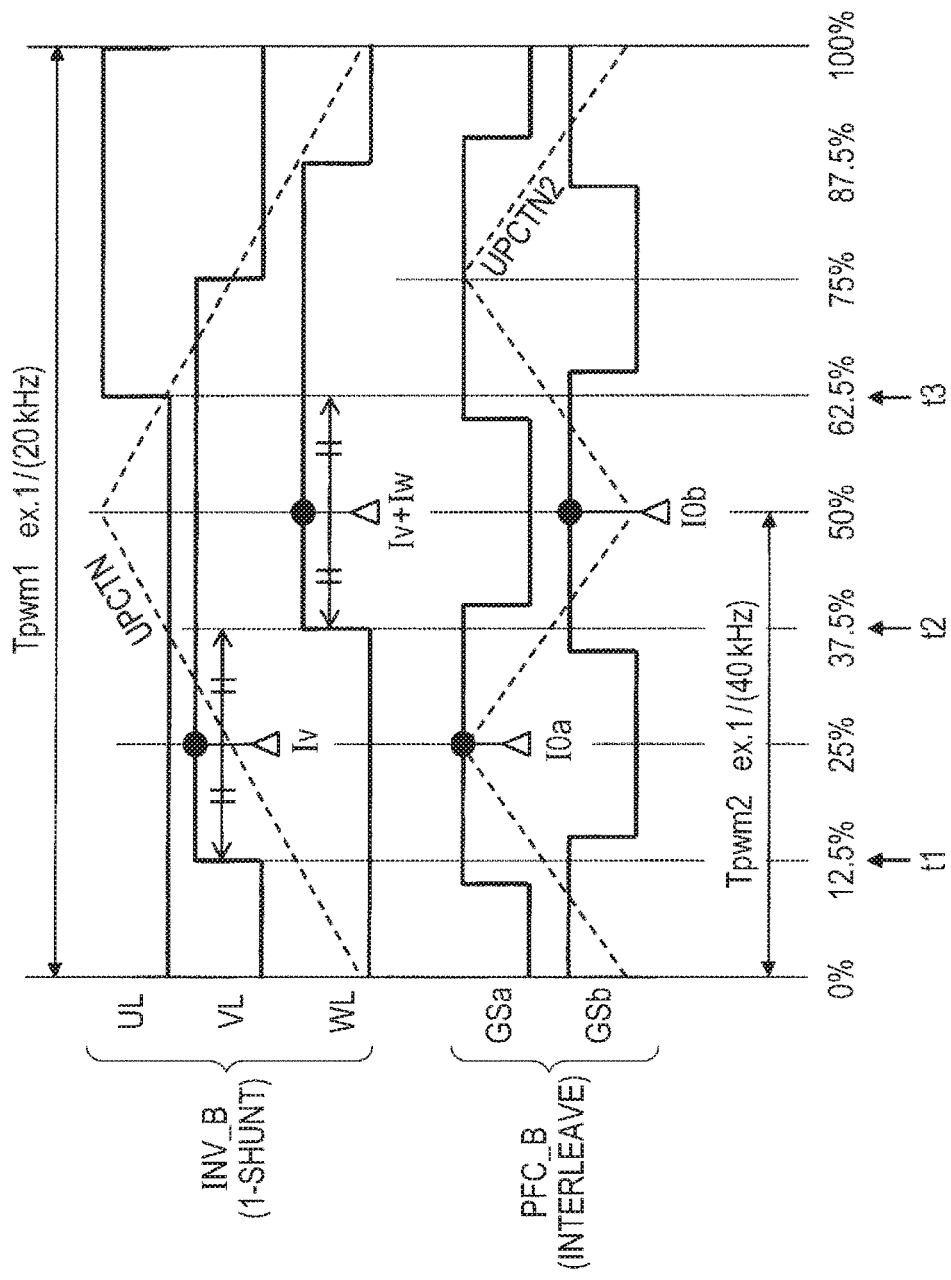
FIG. 12 is a timing chart illustrating another concrete example when the controller in FIG. 3 generates timings by using the second timing generating method.

FIG. 12 is a timing chart illustrating another concrete example when the controller in FIG. 3 generates timings by using the second timing generating method. In the example of FIG. 12, the controller CTLUa generates the edge timing and the AD conversion timing of the 1-shunt inverter circuit INV_B, and the controller CTLUb generates the edge timing and the AD conversion timing of the PFC circuit PFC_B of the interleave type.

In the PFC circuit PFC_B of the interleave type, as also described with reference to FIG. 7, the AD conversion timings are determined at around the peak and the bottom in the count value UPCTN2 having the frequency of twice and the triangle-wave shape. In this case, as illustrated in FIG. 12, when the count value UPCTN having the triangle-wave shape and whose frequency is the reference (1) is set as a reference, the AD conversion timing in the PFC circuit PFC_B is determined as, for example, a timing at around 25% and a timing at around 50% in one cycle. The fixed edge timings t1, t2, and t3 are determined, for example, as a timing around 12.5%, a timing around 37.5%, and a timing around 62.5% in the cycle, respectively.

The PWM timing generation circuit PWMTGb on the 1-shunt inverter circuit INV_B side shifts the rising edge timings of the three phases generated so that phases having wider pulse widths are assigned to earlier timings in the fixed edge timings t1, t2, and t3. In the example of FIG. 12, the rising edge timings of the v phase, w phase, and u phase are assigned to timings of around 12.5%, 37.5%, and 62.5%, respectively. The AD conversion timing generation circuit ADCTGb determines the AD conversion timing at each of timings of around 25% and 50% on the basis of the rising edge timings.

Consequently, the AD conversion timings can be matched between the 1-shunt inverter circuit INV_B and the PFC circuit PFC_B and, as a result, the first reference value or larger can be assured as the interval between each of the AD conversion timings and the edge timing adjacent to it. Although the timings of around 12.5%, 37.5%, and 62.5% are used as the fixed edge timings, the invention is not limited to those timings. It is sufficient to determine the fixed edge timings so that the AD conversion timing (sampling timing) is positioned between adjacent edges in the fixed edge timings.

More preferably, the fixed edge timing may be a timing by which the AD conversion timing of the 1-shunt inverter circuit INV_B can be set at around 25% and at around 50%. That is, when the fixed edge timings are set as [1], [2], and [3], it is sufficient to set an intermediate point between the timings [1] and [2] at around 25%, and set an intermediate point between the timings [2] and [3] at around 50%.

Main Effects of Second Embodiment

Also by using the method of the second embodiment as described above, effects similar to those in the case of the first embodiment can be obtained. Further, as compared with the method of the first embodiment, it is sufficient to perform the process of making synchronization with a fixed edge timing. Consequently, the process loads on the PWM timing generation circuits PWMTGa and PWMTGb and the AD conversion timing generation circuits ADCTGa and ADCTGb can be reduced. That is, in the method of the second embodiment, the communication of the controllers CTLUa and CTLUb as illustrated in FIG. 3 becomes unnecessary.

For example, in FIG. 10, it is desirable to determine the first fixed timing t1 at a sufficiently early timing in reflection of a maximum duty which is allowable. It can prevent a situation such that the falling edge timing of the PWM signal deviates from the PWM cycle Tpwm. As a side effect, for example, when a PWM cycle that the duty of a phase having a widest pulse width becomes almost 50% is generated in the 1-shunt inverter circuit INV_B, the falling edge timing of the PWM signal is set around at the center of the PWM cycle. Depending on the duty of the 3-shunt inverter circuit INV_B, there is a case that the AD conversion timing of the 3-shunt inverter circuit INV_B is set at around the center of the PWM cycle. In this case, a device of avoiding interference between the falling edge timing of the PWM signal and the AD conversion timing is separately necessary.

Therefore, from such a viewpoint, the method of the first embodiment that a timing corresponding to the first fixed timing t1 is not fixed but properly fluctuates is useful. Also in the method of the first embodiment, depending on the situation of the duties of the two inverter circuits, there is still the possibility that the interval between the falling edge timing of the PWM signal and the AD conversion timing becomes narrow. However, such a case is rare as compared with the method of the second embodiment. The method of the second embodiment can be similarly applied to three or more switching circuits. The method as illustrated in FIG. 9 can be further applied.

Third Embodiment

Timing Generating Method [3a]

Figure 13:
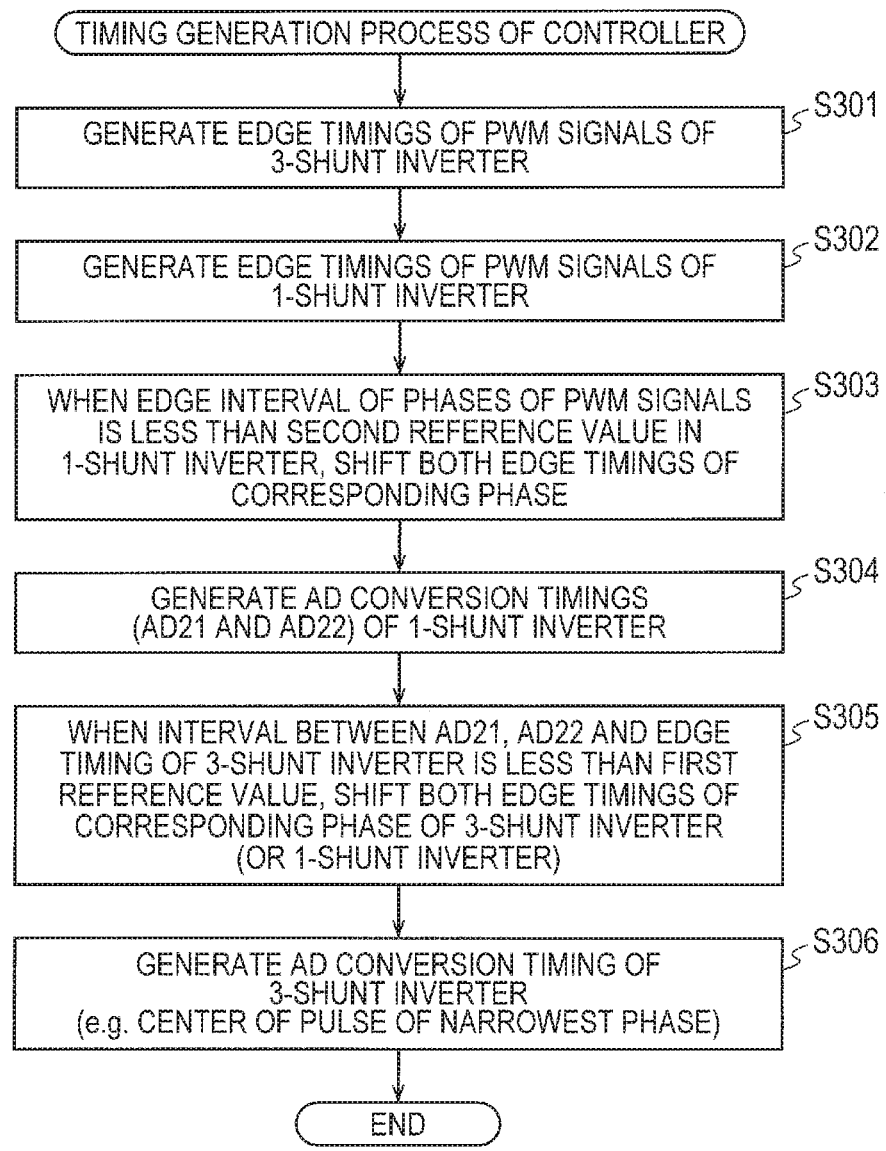
FIG. 13 is a flowchart illustrating an example of processes when the controller in FIG. 3 generates timings by using a third timing generating method in a switching system according to a third embodiment of the present invention.
Figure 14:
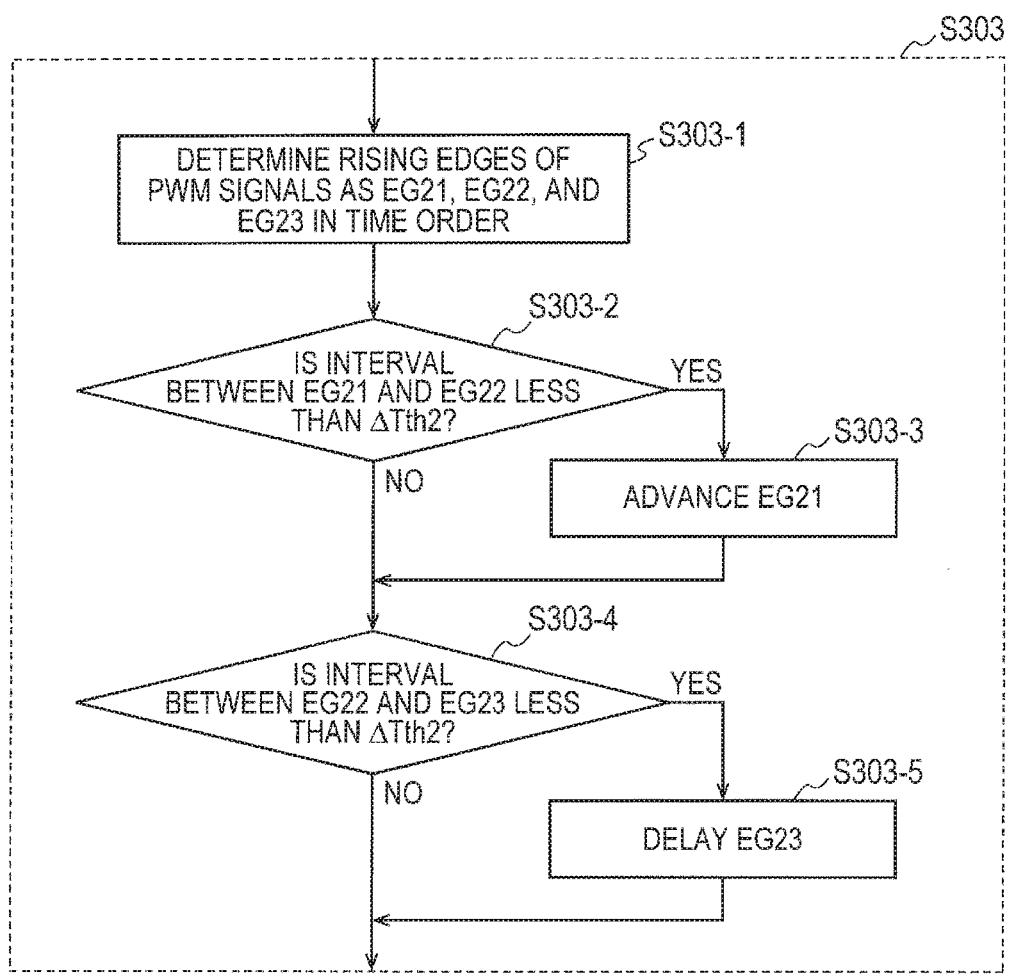
FIG. 14 is a flowchart illustrating a more detailed example of processes of a part of FIG. 13.
Figure 16A:
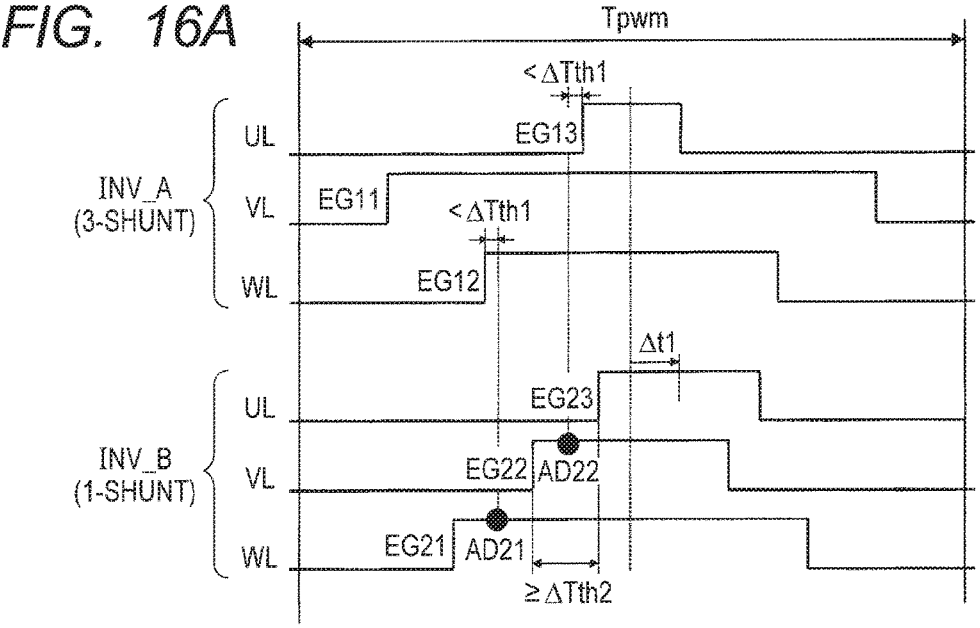
FIGS. 16A and 16B are timing charts illustrating a concrete example of the processes in FIG. 13.
Figure 16B:
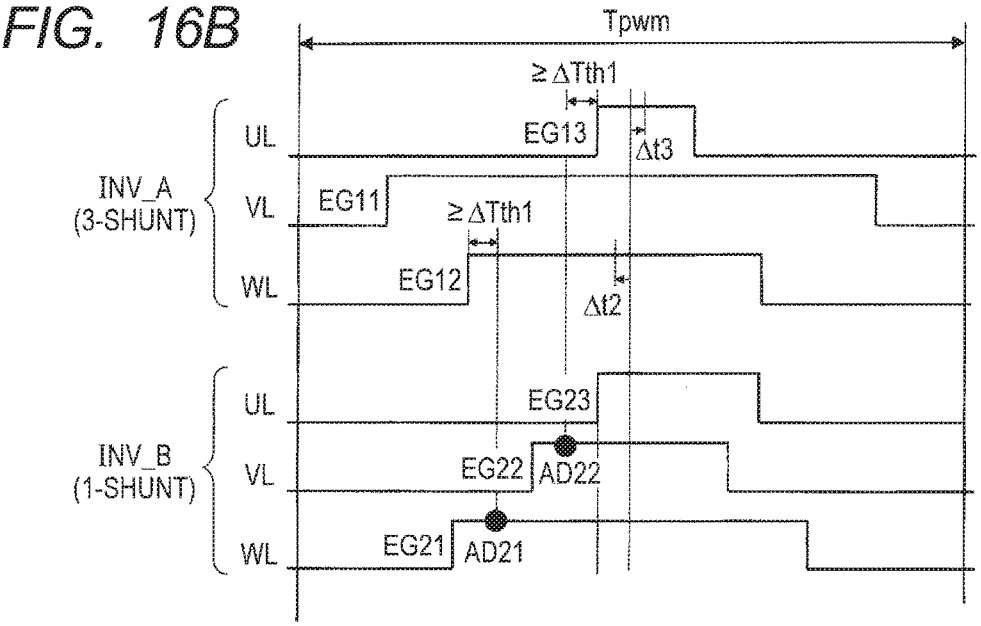

FIG. 13 is a flowchart illustrating an example of processes when the controller in FIG. 3 generates timings by using a third timing generating method in a switching system according to a third embodiment of the present invention. Each of FIGS. 14 and 15 is a flowchart illustrating a more detailed example of processes of a part of FIG. 13. FIGS. 16A and 16B are timing charts illustrating a concrete example of the processes in FIG. 13.

Outline of the third timing generating method is as follows as illustrated in FIGS. 13 and 16A and 16B. First, the PWM timing generation circuits PWMTGa and PWMTGb generate edge timings of PWM signals every PWM cycle. After that, the PWM timing generation circuit of at least one of the controllers verifies the interval between the edge timing generated by itself and the AD conversion timing in the other controller and, when the interval is less than a first reference value, shifts the edge timing of itself so that the interval becomes equal to or larger than the first reference value. Alternatively, the PWM timing generation circuit of at least one of the controllers verifies the interval between the edge timing generated by the other controller and the AD conversion timing generated by the controller of itself and, when the interval is less than a first reference value, shifts the edge timing of itself so that the interval becomes equal to or larger than the first reference value.

In the example of FIGS. 16A and 16B, the controller CTLUa generates the edge timings of the 3-shunt inverter circuit INV_A and AD conversion timings, and the controller CTLUb generates the edge timings of the 1-shunt inverter circuit INV_B and the AD conversion timings. In this case, in FIG. 13, the PWM timing generation circuit PWMTGa generates the edge timing of the PWM signal of the 3-shunt inverter circuit INV_A (step S301), and the PWM timing generation circuit PWMTGb generates the edge timing of the PWM signal of the 1-shunt inverter circuit INV_B (step S302).

Subsequently, when the interval of edges of phases of the PWM signal generated in step S302 is less than a second reference value (for example, 2 µs), the PWM timing generation circuit PWMTGa on the 1-shunt inverter circuit INV_B side shifts both edge timings of the corresponding phase so that the interval becomes equal to or larger than the second reference value (step S303). Concretely, as illustrated in FIG. 14, the PWM timing generation circuit PWMTGb sets rising edge timings of the PWM signal of three phases as "EG21", "EG22", and "EG23" in time order (step S303-1) and determines whether the interval between "EG21" and "EG22" is less than a second reference value ΔTth2 or not (step S303-2).

The PWM timing generation circuit PWMTGb moves to a process in step S303-4 when the interval is equal to or larger than the second reference value ΔTth2 and, when the interval is less than the second reference value ΔTth2, advances "EG21" so that the interval becomes equal to or larger than the second reference value ΔTth2 (step S303-3) and, then, moves to the process in step S303-4. In the step S303-4, the PWM timing generating circuit PWMTGb determines whether the interval between "EG22" and "EG23" is less than the second reference value ΔTth2 or not. When the interval is equal to or larger than the second reference value ΔTth2, the PWM timing generation circuit PWMTGb moves to a process in step S304 in FIG. 13. When the interval is less than the second reference value ΔTth2, advances "EG21" so that the interval becomes equal to or larger than the second reference value ΔTth2 (step S303-3) and, then, moves to the process in step S303-4. In the step S303-4, the PWM timing generating circuit PWMTGb determines whether the interval between "EG22" and "EG23" is less than the second reference value ΔTth2 or not. When the interval is equal to or larger than the second reference value ΔTth2, the PWM timing generation circuit PWMTGb moves to the process in step S304 in FIG. 13.

As a concrete example, in FIG. 16A, at the stage of step S302, the interval between the rising edge timing EG22 of the v phase of the 1-shunt inverter circuit INV_B and the rising edge timing EG23 of the u phase is less than the second reference value ΔTth2. Consequently, the PWM timing generation circuit PWMTGb delays the rising edge timing EG23 (and the falling edge timing) of the u phase only by Δt1 so that the interval becomes equal to or larger than the second reference value ΔTth2.

In step S304 in FIG. 13, the AD conversion timing generation circuit ADCTGb on the 1-shunt inverter circuit INV_B side determines, as illustrated in FIG. 16A, the AD conversion timing AD21 at around an intermediate point between the edge timings EG21 and EG22 and determines the AD conversion timing AD22 at around an intermediate point between the edge timings E22 and E23. Subsequently, in step S305, the PWM timing generation circuit PWMTGa on the 3-shunt inverter circuit INV_A side verifies the intervals between the edge timings of the phases generated in step S301 and the AD conversion timings AD21 and AD22 on the 1-shunt inverter circuit INV_B side. When the interval is less than the first reference value (for example, 1 μs), the PWM timing generation circuit PWMTGa shifts the edge timing of the corresponding phase of itself so that the interval becomes equal to or larger than the first reference value in a state where the duty is maintained.

In step S305, the PWM timing generation circuit PWMTGb on the 1-shunt inverter circuit INV_B side verifies the intervals between the edge timings of the phases on the 3-shunt inverter circuit INV_A side generated in step S301 and the AD conversion timings AD21 and AD22 on the 1-shunt inverter circuit INV_B side. When the interval is less than the first reference value (for example, 1 μs), the PWM timing generation circuit PWMTGb shifts the edge timing of the corresponding phase of itself so that the interval becomes equal to or larger than the first reference value in a state where the duty is maintained.

Using the case that the PWM timing generation circuit PWMTGa on the 3-shunt inverter circuit INV_A side performs the shifting operation by the former one of the two methods in step S305 as an example, the details will be described. As illustrated in FIG. 15, the PWM timing generation circuit PWMTGa sets as i=1 and j=1 (steps S305-1 and S305-2), and determines whether the interval between an AD conversion timing AD2$i$ (AD21) and an edge timing EG1$j$ (EG11) is less than the first reference value ΔTth1 or not (step S305-3). When the interval is equal to or larger than the first reference value ΔTth1, the PWM timing generation circuit PWMTGa moves to the process of step S305-7.

On the other hand, when the interval is less than the first reference value ΔTth1, the PWM timing generation circuit PWMTGa determines which one of the AD conversion timing AD2$i$ (AD21) and the edge timing EG1$j$ (EG11) is earlier (step S305-4). When the edge timing EG1$j$ (EG11) is earlier, the PWM timing generation circuit PWMTGa advances the edge timing EG1$j$ (EG11) so that the interval with the AD conversion timing AD2$i$ (AD21) becomes equal to or larger than the first reference value ΔTth1 and, after that, moves to the process of step S305-7 (step S305-5). On the other hand, when the AD conversion timing AD2$i$ (AD21) is earlier, the PWM timing generation circuit PWMTGa delays the edge timing EG1$j$ (EG11) so that the interval with the AD conversion timing AD2$i$ (AD21) becomes equal to or larger than the first reference value ΔTth1 and, after that, moves to the process of step S305-7 (step S305-6).

The PWM timing generation circuit PWMTGa increments "j" in step S305-7, returns to step S305-3, and repeats similar process until "j" exceeds 3 in step S305-8. As a result, the interval between the AD conversion timing AD21 and each of the edge timings EG11, EG12, and EG13 becomes equal to or larger than the first reference value ΔTth1. When "j" exceeds 3, the PWM timing generation circuit PWMTGa increments "i" in step S305-9, returns to step S305-2 and repeats similar process until "i" exceeds 2. As a result, the interval between the AD conversion timing AD22 and each of the edge timings EG11, EG12, and EG13 becomes equal to or larger than the first reference value ΔTth1.

As a concrete example, in FIG. 16A, at the stage of step S304, the interval between the rising edge timing EG12 of the w phase of the 3-shunt inverter circuit INV_A and the AD conversion timing AD21 of the 1-shunt inverter circuit INV_B is less than the first reference value ΔTth1. The interval between the rising edge timing EG13 of the u phase of the 3-shunt inverter circuit INV_A and the AD conversion timing AD22 of the 1-shunt inverter circuit INV_B is less than the first reference value ΔTth1.

As illustrated in FIG. 16B, the PWM timing generation circuit PWMTGa advances the edge timing EG12 only by Δt2 so that the interval between the rising edge timing E12 of the w phase and the AD conversion timing AD21 becomes equal to or larger than the first reference value ΔTth1 by the process of step S305-5. The PWM timing generation circuit PWMTGa delays the edge timing EG13 only by Δt3 so that the interval between the rising edge timing E13 of the u phase and the AD conversion timing AD22 becomes equal to or larger than the first reference value ΔTth1 by the process of step S305-6.

After such processes, in step S306 in FIG. 13, the AD conversion timing generation circuit ADCTGa on the 3-shunt inverter circuit INV_A side generates an AD conversion timing of the 3-shunt inverter circuit INV_A. The AD conversion timing is determined at around the center of a pulse of a phase having the narrowest pulse width (in the example of FIG. 16B, u phase) in the 3-shunt inverter circuit INV_A.

Regarding step S306, referring to FIG. 16B, in reality, it is sufficient to assure, for example, 1 μs or larger as the interval (that is, ΔTth1) between the AD conversion timing and the edge adjacent to it for the PWM cycle Tpwm of 50 μs (20 kHz) to 100 μs (10 kHz). In accordance with this, it is sufficient to assure 2 μs or larger as the interval (that is, ΔTth2) between adjacent edges in the 1-shunt inverter circuit INV_B. Consequently, each of the shift amounts (Δt1 to Δt3) is, in reality, about a few μs for the PWM cycle Tpwm of 50 μs to 100 μs. In this case, it is considered that when the AD conversion timing of the 3-shunt inverter circuit INV_A is determined at the center of a pulse of a phase having the narrowest pulse width or the like, a sufficient margin can be maintained for the edge timings of the 1-shunt inverter circuit INV_B.

In step S305, when the PWM timing generation circuit PWMTGb on the 1-shunt inverter circuit INV_B side performs the shifting operation, the PWM timing generation circuit PWMTGb performs, for example, the shifting operation in a state where the edge intervals among the phases are maintained at the second reference value or larger. The AD conversion timing generation circuit ADCTGb sequentially updates the AD conversion timings (AD21 and AD22) in accordance with the shifting operation.

Figure 17:
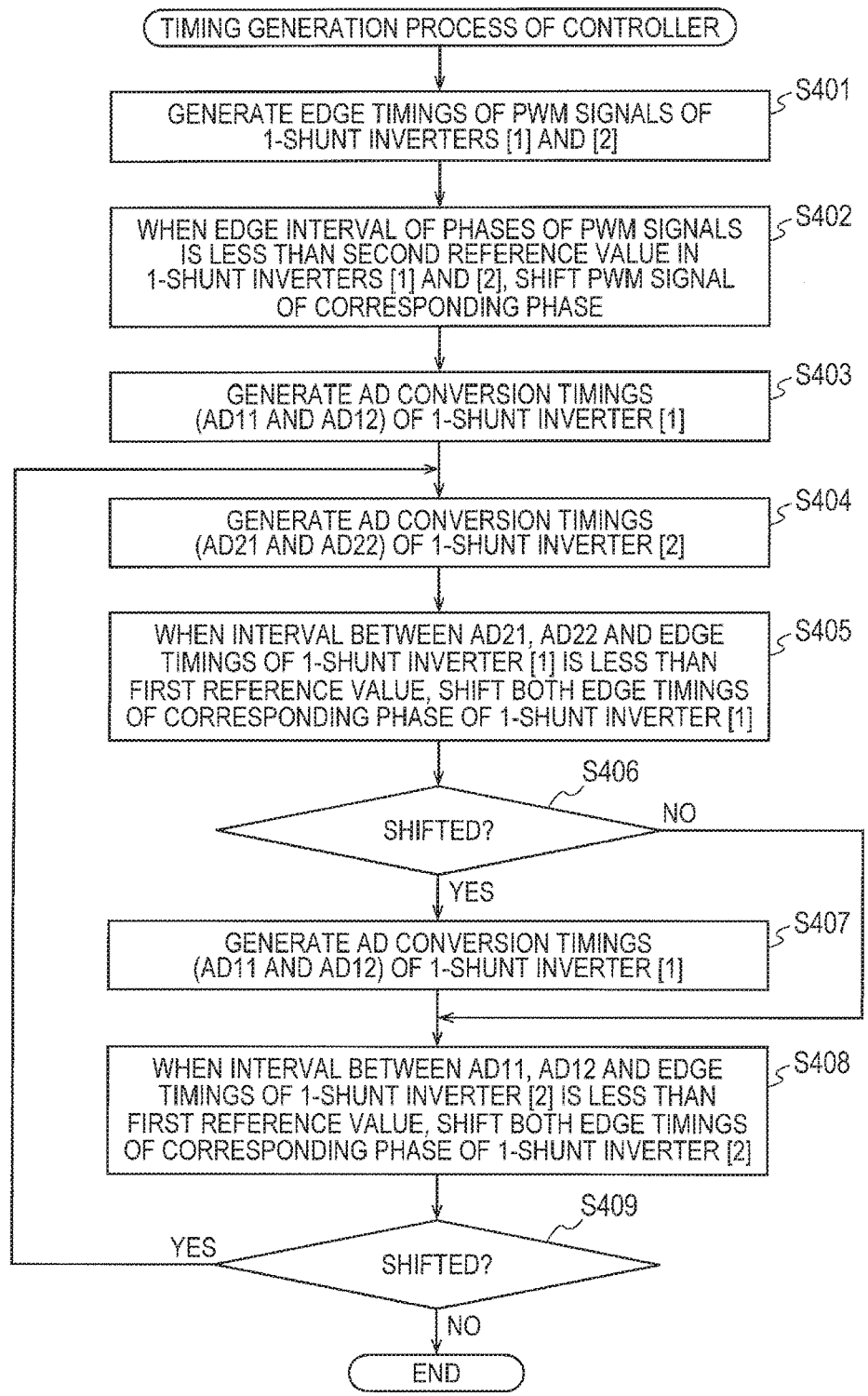
FIG. 17 is a flowchart illustrating an example of processes obtained by modifying FIG. 13.

FIG. 17 is a flowchart illustrating an example of processes obtained by modifying FIG. 13. In this example, both the controllers CTLUa and CTLUb in FIG. 3 generate the edge timings and the AD conversion timings of the 1-shunt inverter circuit. In FIG. 17, the PWM timing generation circuit PWMTGa and PWMTGb generate edge timings of the PWM signals of the 1-shunt inverters [1] and [2] (step S401). In a manner similar to the processes in FIG. 14, when the edge interval among the phases of the generated PWM signals is less than the second reference value, the PWM timing generation circuits PWMTGa and PWMTGb shift the both edge timings of the corresponding phase (step S402).

Subsequently, in a manner similar to the case of FIG. 16A, the AD conversion timing generation circuit ADCTGa on the 1-shunt inverter circuit [1] side determines AD conversion timings (AD11 and AD12) at around an intermediate point between the edge timings (step S403). Similarly, the AD conversion timing generation circuit ADCTGb on the 1-shunt inverter circuit [2] side also determines AD conversion timings (AD21 and AD22) at around an intermediate point between the edge timings (step S404).

In a manner similar to the process in FIG. 15, the PWM timing generation circuit PWMTGa on the 1-shunt inverter circuit [1] side verifies an interval between the edge timing of each phase generated in step S401 and the AD conversion timing (AD21, AD22) on the 1-shunt inverter circuit [2] side. When the interval is less than the first reference value, the PWM timing generation circuit PWMTGa shifts the edge timing of the corresponding phase in a state where the duty is maintained so that the interval becomes equal to or larger than the first reference value (step S405).

When the shift is not executed, the PWM timing generation circuit PWMTGa moves to step S408. When the shift is executed, the PWMTGa updates the AD conversion timings (AD11 and AD12) via the AD conversion timing generation circuit ADCTGa and moves to step S408 (steps S406 and S407). As a result, the interval between each of the edge timings on the 1-shunt inverter circuit [1] side and the AD conversion timing (AD21, AD22) on the 1-shunt inverter circuit [2] side is assured, and a state where each of the AD conversion timings (AD11 and AD12) is set at around an intermediate point between the edge timings on the 1-shunt inverter circuit [1] side is configured.

In step S408, opposite to step S405, the PWM timing generation circuit PWMTGb on the 1-shunt inverter circuit [2] side verifies the interval between the edge timing of each phase generated in step S401 and the AD conversion timing (AD11, AD12) on the 1-shunt inverter circuit [1] side. When the interval is less than the first reference value, the PWM timing generation circuit PWMTGb shifts the edge timing of the corresponding phase so that the interval becomes equal to or larger than the first reference value in a state where the duty is maintained.

The PWM timing generation circuit PWMTGb finishes the process when the shift is not executed and, when the shift is executed, returns to step S404 and updates the AD conversion timings (AD21 and AD22) via the AD conversion timing generation circuit ADCTGb (step S409). As a result, the interval between each of the edge timings on the 1-shunt inverter circuit [2] side and the AD conversion timing (AD11, AD12) on the 1-shunt inverter circuit [1] side is assured, and a state where each of the AD conversion timings (AD21 and AD22) is set at around an intermediate point between the edge timings on the 1-shunt inverter circuit [2] side is configured. In the 1-shunt inverter circuits [1] and [2], in a state where each of the AD conversion timings is set at around an intermediate point of the edge timings, the loop process of steps S404 to S409 is executed until the interval between an edge timing of one of the circuits and the AD conversion timing of the other becomes equal to or larger than the first reference value.

Although the 1-shunt inverter circuit [1] side is shifted in step S405 and the 1-shunt inverter circuit [2] side is shifted in step S408, in a manner similar to the case of FIG. 13, it is also possible to shift the 1-shunt inverter circuit [2] side in step S405 and shift the 1-shunt inverter circuit [1] side in step S408. In this case, an object of the AD conversion timing generated in steps S403, S404, and S407 is replaced between the 1-shunt inverter circuits [1] and [2].

Timing Generating Method [3b]

Figure 18:
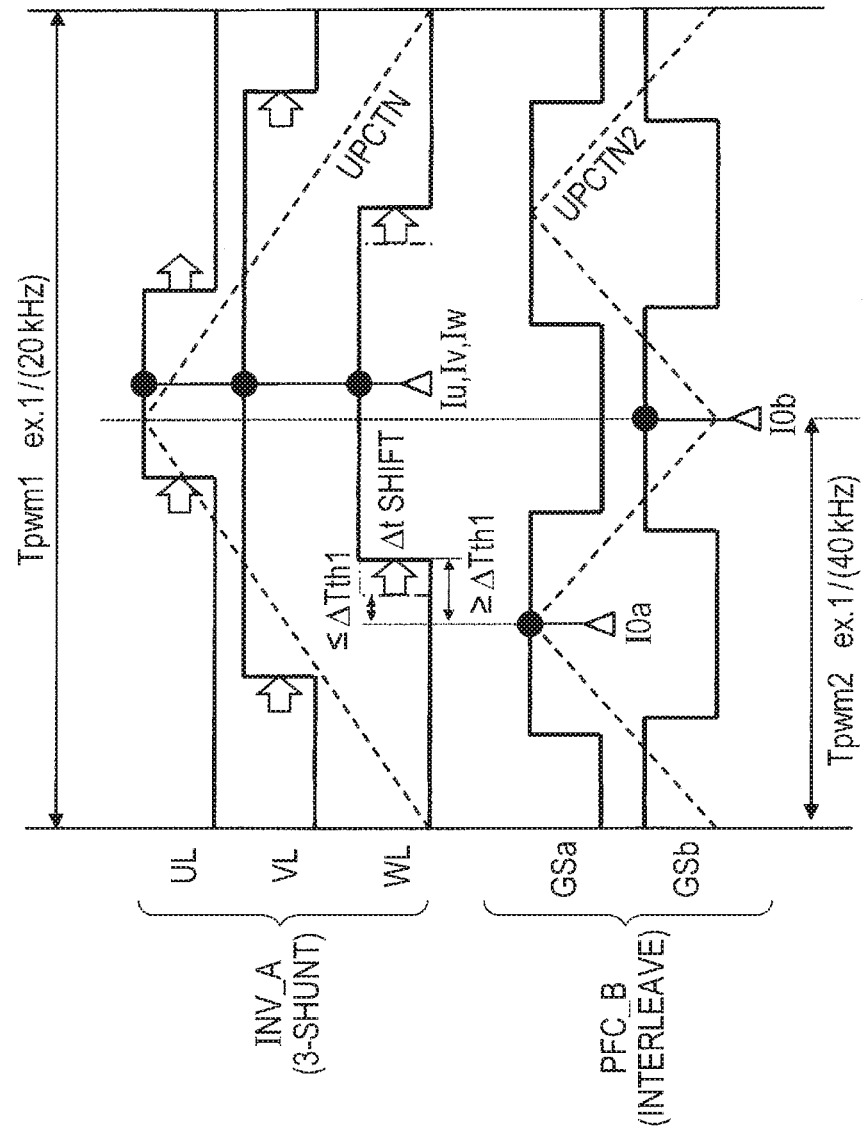
FIG. 18 is a timing chart illustrating another concrete example when the controller in FIG. 3 generates timings by using a third timing generating method.

FIG. 18 is a timing chart illustrating another concrete example when the controller in FIG. 3 generates timings by using the third timing generating method. In the example of FIG. 18, the controller CTLUa generates the edge timings and AD conversion timings of the 3-shunt inverter circuit INV_A, and the controller CTLUb generates the edge timings and AD conversion timings of the PFC circuit PFC_B of the interleave type.

In the case of a combination of the 3-shunt inverter circuit INV_A and the PFC circuit PFC_B, it is sufficient for the PWM timing generation circuit PWMTGa on the 3-shunt inverter circuit INV_A side to shift a generated edge timing so that the interval between the edge timing and the AD conversion timing on the PFC circuit PFC_B side becomes equal to or larger than the first reference value ΔTth1. In the example of FIG. 18, at a stage when the PWM timing generation circuit PWMTGa generates an edge timing for the first time, the interval between the rising edge timing of the w phase and the AD conversion timing (IOa) on the gate control signal GSa side of the PFC circuit PFC_B is less than the first reference value ΔTth1.

Consequently, the PWM timing generation circuit PWMTGa shifts at least both edge timings of the w phase. In this example, to maintain the timing relations with the phases and the AD conversion timings, the PWM timing generation circuit PWMTGa shifts the u phase and the v phase as well only by the shift amount of the w phase. In the case of such a combination, only the interval between the AD conversion timing (IOa) on the gate control signal GSa side and each of the edge timings of the 3-shunt inverter circuit INV_A becomes an issue. Therefore, for example, when the rising edge timings are preliminarily determined so that the edge interval becomes equal to or larger than a second reference value (for example, 2 μs), by simply shifting the three phases, the PWM timing generation circuit PWMTGa can assure a first reference value (for example, 1 μs) or larger as the interval with the AD conversion timing (IOa).

Timing Generating Method [3c]

Figure 19:
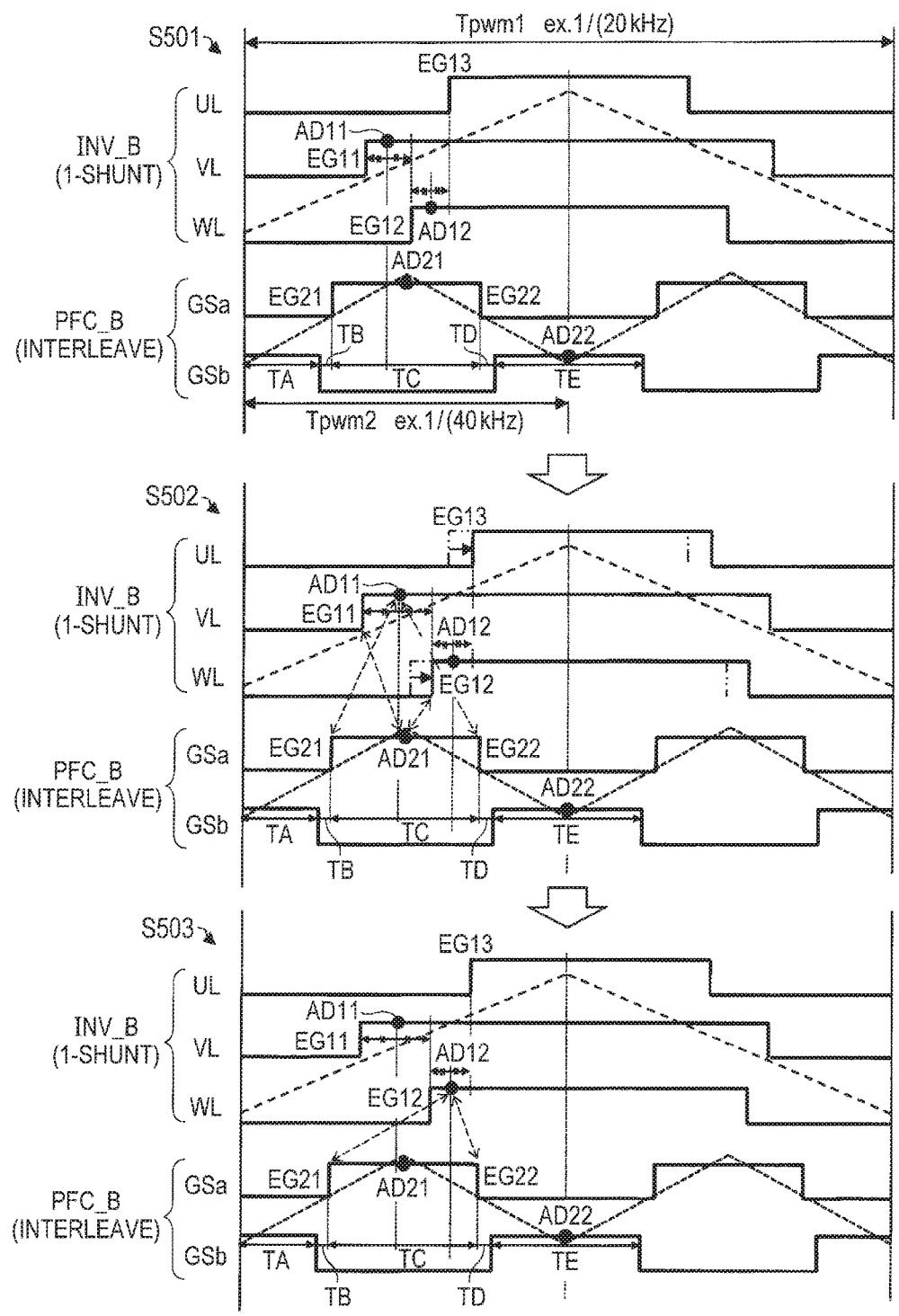
FIG. 19 is a timing chart illustrating a further another concrete example when the controller in FIG. 3 generates timings by using the third timing generating method.
Figure 20:
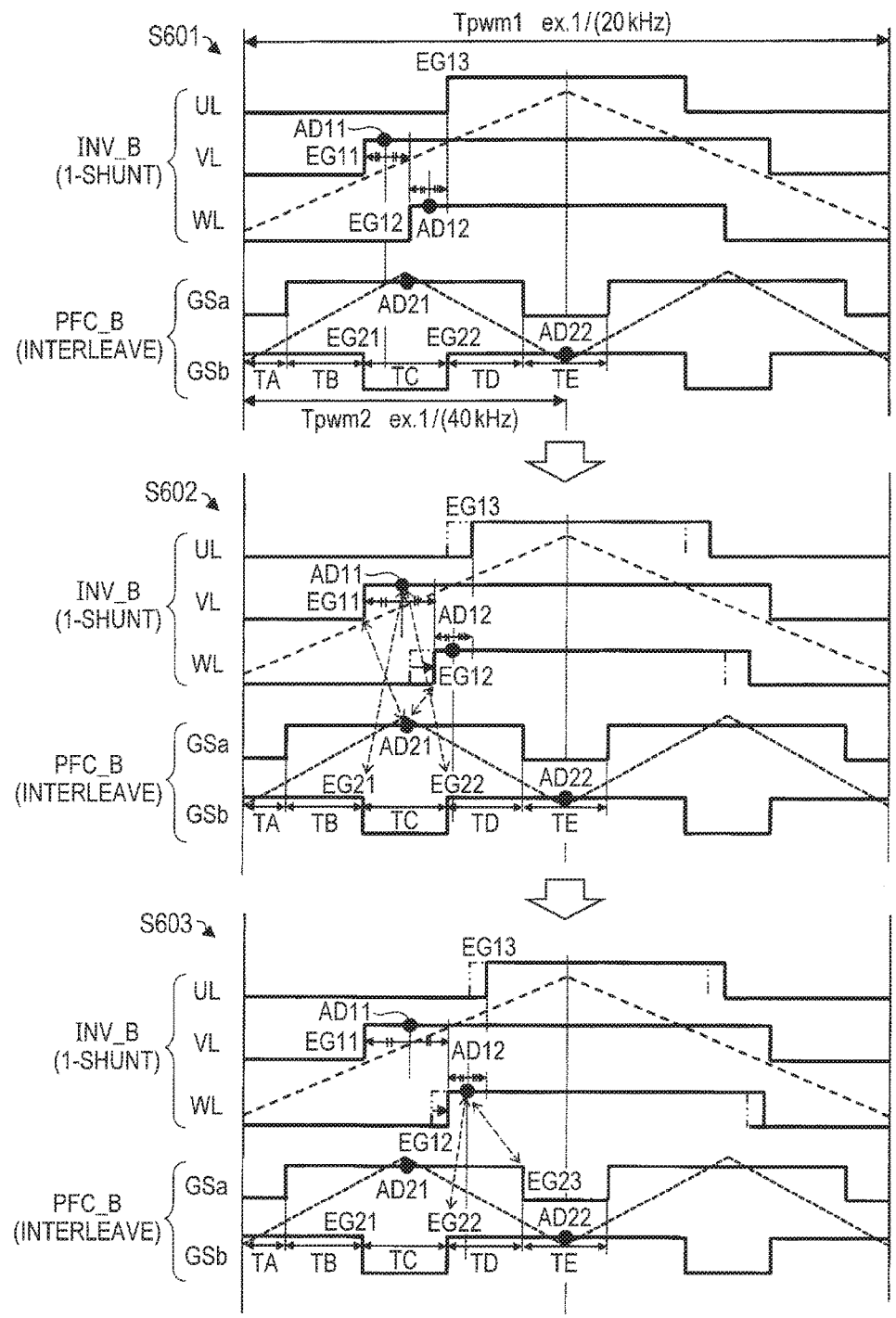
FIG. 20 is a timing chart illustrating a further another concrete example when the controller in FIG. 3 generates timings by using the third timing generating method.

FIGS. 19 and 20 are timing charts illustrating a further another concrete example when the controller in FIG. 3 generates timings by using the third timing generating method. In the example of FIGS. 19 and 20, the controller CTLUa generates the edge timings and AD conversion timings of the 1-shunt inverter circuit INV_B, and the controller CTLUb generates the edge timings and AD conversion timings of the PFC circuit PFC_B of the interleave type.

As illustrated in steps S501 and S601 in FIGS. 19 and 20, the controller CTLUa generates the rising edge timings EG11, EG12, and EG13 and the AD conversion timings AD11 and AD12 in the 1-shunt inverter circuit INV_B. The interval between the edge timings EG11 and EG12 is equal to or larger than the second reference value (for example, 2 μs), and the AD conversion timing AD11 is set to around an intermediate point between them. Similarly, the interval between the edge timings EG12 and EG13 is equal to or larger than the second reference value, and the AD conversion timing AD12 is set to around an intermediate point between them.

Subsequently, the controller CTLUa determines a period including the AD conversion timing AD11 from periods TA to TE each between adjacent edge timings in the PFC circuit PFC_B. In the example of step S501 in FIG. 19, the AD conversion timing AD11 is included in the period TC. If the period TC is less than the second reference value, the controller CTLUa shifts the edge timings of the three phases so that the AD conversion timing AD11 is included in the period adjacent to the period TC. In this example, the period TC is a period equal to or longer than the second reference value.

In this case, the controller CTLUa shifts both edge timings of a corresponding phase and a phase later than the corresponding phase so that the interval between the AD11 and each of the edge timings EG21 and EG22 at both ends of the period TC becomes equal to or larger than the first reference value. Further, when the period TC includes the AD conversion timing AD21 of the PFC circuit PFC_B, the controller CTLUa also shifts both edge timings of the corresponding phase and the phase later than the corresponding phase so that the interval between the AD conversion timing AD21 and each of the edge timings EG11 and EG12 determining the AD conversion timing AD11 becomes equal to or larger than the first reference value.

In the example of step S501 in FIG. 19, the interval between the AD conversion timing AD21 and the edge timing EG12 is less than the first reference value. In this case, as illustrated in S502, the controller CTLUa shifts both edge timings of the w phase corresponding to the edge timing E12 and both edge timings of the u phase later than the w phase so that the interval becomes equal to or larger than the first reference value. Based on the state after the shift, the controller CTLUa updates the AD conversion timings AD11 and AD12.

Subsequently, in a manner similar to the case of the AD conversion timing AD11, the controller CTLUa determines a period including the AD conversion timing AD12 from the periods TA to TE. In the example of step S502 in FIG. 19, the AD conversion timing AD12 is included in the period TC. In this case, the controller CTLUa shifts both edge timings of a corresponding phase so that the interval between the AD12 and each of the edge timings EG21 and EG22 as both ends of the period TC becomes equal to or larger than the first reference value. In addition, the controller CTLUa shifts both edge timings of a corresponding phase so that the interval between the AD21 and each of the edge timings EG12 and EG13 determining the AD conversion timing AD12 becomes equal to or larger than the first reference value. In the example of step S503 in FIG. 19, the shift is unnecessary.

In the example of step S602 in FIG. 20, like the case of step S502 in FIG. 19, the AD conversion timing AD11 is included in the period TC, and the controller CTLUa shifts both edge timings of the w and u phases to maintain the interval from the AD conversion timing AD21. As a result, in the example of step S602 in FIG. 20, different from the case of step S502 in FIG. 19, the AD conversion timing AD12 is included in the period TD.

If the period TD is less than the second reference value, the controller CTLUa shifts the edge timings of the two phases to the delay side so that the AD conversion timing AD12 is included in a period adjacent to the period TD. In the example, the period TD is a period equal to or larger than the second reference value. In this case, as illustrated in step S603, the controller CTLUa shifts both edge timings of a corresponding phase and a phase later than the corresponding phase so that the interval between the AD conversion timing AD12 and each of the edge timings EG22 and EG23 as both ends of the period TD becomes equal to or larger than the first reference value.

In the examples of steps S602 and S603 in FIG. 20, the interval between the AD conversion timing AD12 and the edge timing EG22 is less than the first reference value. In this case, the controller CTLUa shifts both edge timings of the w phase corresponding to the AD conversion timing AD12 and the u phase so that the interval becomes equal to or larger than the first reference value. The controller CTLUa updates the AD conversion timings AD11 and AD12 on the basis of the state after the shift.

In the case where two AD conversion timings AD11 and AD21 are included in the period TC including the AD conversion timing AD21 like the case of step S502 in FIG. 19, in reality, there is a case that the length of the period TC is short for the second reference value. Specifically, for example, when the length of the period TC is about an intermediate length between the length in step S502 in FIG. 19 and that in step S602 in FIG. 20, there is the possibility that the AD conversion timing AD12 is not set within the period TC. In such a case, for example, it is sufficient to perform a process of determining whether the interval between the edge timing EG12 on the earlier side determining the AD conversion timing AD12 and the edge timing EG22 on the later side in the period TC is equal to or larger than the second reference value and, when it is less than the second reference value, shifting the AD conversion timing to the adjacent period TD.

Although the 1-shunt inverter circuit INV_B is combined with the PFC circuit PFC_B of the interleave type in this case, it can be also combined with a PFC circuit PFC of a single phase as illustrated in FIG. 1. In this case, for example, like the case of step S305 in FIG. 13, it is sufficient that the PWM signal generation circuit on the 1-shunt inverter circuit INV_B side shifts its edge timings so that the interval between the AD conversion timing on the side of itself and the edge timing on the PFC circuit PFC side becomes equal to or larger than the first reference value.

Main Effects of Third Embodiment

Also by using the method of the second embodiment as described above, effects similar to those in the case of the first embodiment can be obtained. Further, as compared with the methods of the first and second embodiments, although the process load accompanying the computing process increases, it can be more flexibly addressed to combinations of various switching circuits. Particularly, in the case of the combination of the 3-shunt inverter circuit INV_A and the 1-shunt inverter circuit INV_B as illustrated in FIG. 4, as described above, it is desired to perform adjustment using the 3-shunt inverter circuit INV_A as a reference inverter. In this case, however, for example, when a phase having a very wide pulse width is generated on the 1-shunt inverter circuit INV_B side, there is the possibility that the falling edge timing deviates from the PWM cycle Tpwm. When the method of the third embodiment is used, as understood from FIGS. 16A and 16B, such a situation hardly occurs.

That is, the method of the third embodiment is not a method of largely shifting an edge timing accompanying the adjustment like in the methods of the first and second embodiments but is a method of shifting only an inconvenient edge timing to a level where the inconvenience does not occur using, as a reference, the original edge timings generated symmetrically with respect to the center of the PWM cycle Tpwm. Consequently, the shift amount of each of the edge timings from the original edge timing can be made small. As a result, as compared with the methods of the first and second embodiments, a situation that the falling edge of the PWM signal deviates from the PWM cycle Tpwm and a situation that the AD conversion timing and the falling edge of the PWM signal interfere each other can be more prevented from occurring.

Fourth Embodiment

Details of Main Part of PWM Timing Generation Circuit

Figure 21A:
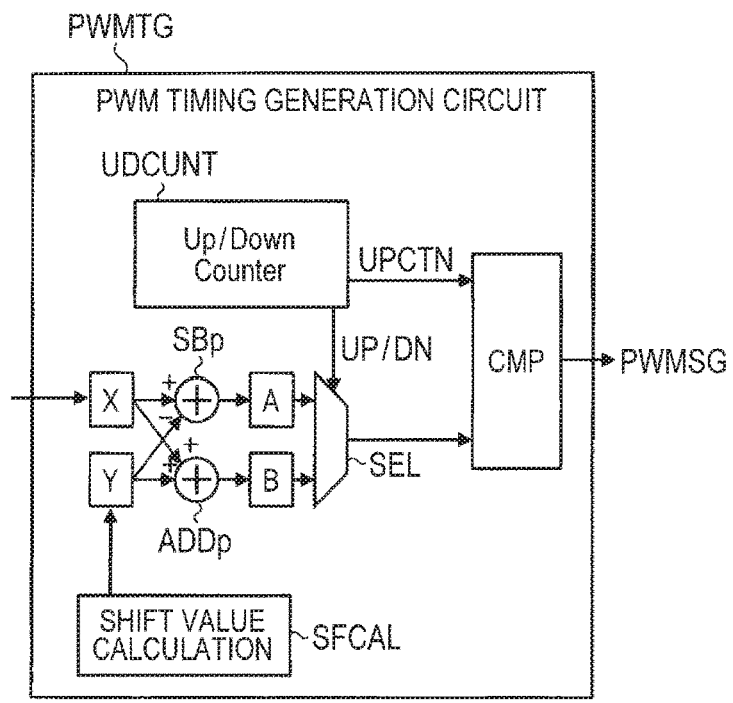
FIG. 21A is a circuit block diagram illustrating a configuration example of a main part of a PWM timing generation circuit in FIG. 3 in a switching system according to a fourth embodiment of the present invention.
Figure 21B:
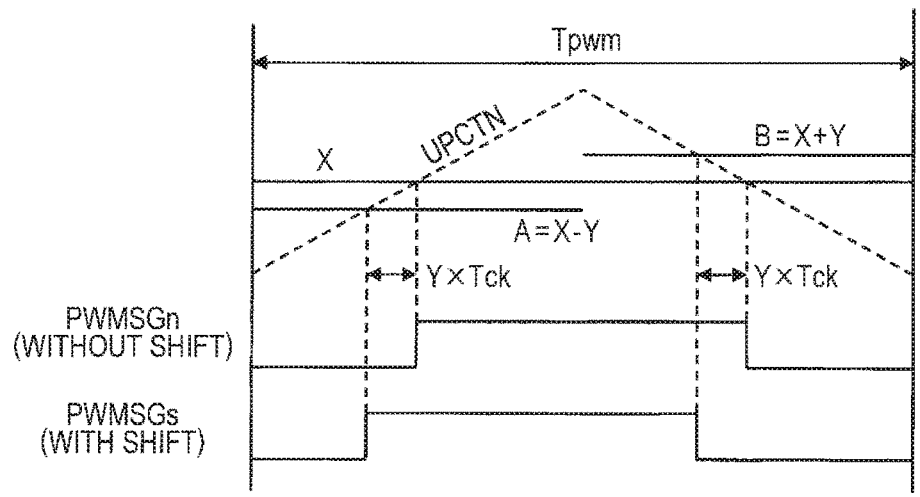
FIG. 21B is a timing chart illustrating the operation example of FIG. 21A.

FIG. 21A is a circuit block diagram illustrating a configuration example of a main part of the PWM timing generation circuit in FIG. 3 in a switching system according to a fourth embodiment of the present invention, and FIG. 21B is a timing chart illustrating the operation example of FIG. 21A. The PWM timing generation circuit PWMTG illustrated in FIG. 21A has an up-down counter circuit UDCUNT, a subtraction circuit SBp, an addition circuit ADDp, a selection circuit SEL, a comparison circuit CMP, and a shift value calculation circuit SFCAL. The up-down counter circuit UDCUNT generates a count value of a triangle-wave shape by the count value UPCTN as illustrated in FIG. 21B.

The shift value calculation circuit SFCAL calculates a shift value "Y" based on each of the shift amounts described in the first to third embodiments. The subtraction circuit SBp subtracts a shift value "Y" from a comparison value "X" from the duty calculation circuit (for example, DTYGa) in FIG. 3. The addition circuit ADDp adds the shift value "Y" to the comparison value "X". The selection circuit SEL selects one of a comparison value "A" from the subtraction circuit SBp or a comparison value "B" from the addition circuit ADDp in accordance with whether the operation of the up-down counter circuit UDCUNT is a count-up operation (UP) or a count-down operation (DN), and outputs it. The comparison circuit CMP compares the count value UDCTN of the up-down counter circuit UDCUNT and the comparison value from the selection circuit SEL and outputs the PWM signal PWMSG. In practice, the comparison values "X", "A", and "B" and the shift value "Y" are held by, for example, a register or the like.

In the example of FIG. 21B, the selection circuit SEL selects the comparison value "A" from the subtraction circuit SBp in the count-up operation (UP) and selects the comparison value "B" from the addition circuit ADDp in the count-down operation (DN). As a result, as illustrated in FIG. 21B, a PWM signal PWMSGs having the same pulse width (duty value) as that of a PWM signal PWMSGn based on the comparison value "X" and shifted only by "Y×Tck" (Tck is a clock cycle of the up-down counter circuit UDCUNT) can be generated.

As described above, in the embodiments, various shifting processes are performed. The PWM timing generation circuit as a comparison example does not have, for example, the subtraction circuit SBp and the addition circuit ADDp. In this case, process of calculating the comparison values "A" and "B" by a program process or the like each time the shifting process is performed and storing them into a corresponding register is necessary. When the configuration example of FIG. 21A is used, the process of calculating the comparison values "A" and "B" and the process of storing the values into a register are performed automatically by hardware, so that the process load of the program process and the like can be reduced.

Further, in the comparison example, the comparison values which are different at the count-up time and the count-down time have to be supplied to the PWM timing generation circuit, so that interruption has to be made twice at the timings of peak and bottom of the count value UPCTN every PWM cycle Tpwm. On the other hand, when the configuration of FIG. 21A is used, it is sufficient to supply the same comparison value at the count-up time and the count-down time to the PWM timing generation circuit. Consequently, it is sufficient to make interruption once every PWM cycle Tpwm. Consequently, the process load accompanying the interruption process can be reduced.

Although the present invention achieved by the inventors herein has been concretely described based on the embodiments, the invention is not limited to the foregoing embodiments but can be variously changed without departing from the gist. For example, the foregoing embodiments have been specifically described to explain the present invention so as to be easily understood, and the present invention is not limited to an embodiment having all of the configurations described. A part of the configurations in an embodiment can be replaced by a configuration in another embodiment. A configuration of an embodiment can be added to a configuration in another embodiment. To a part of configurations in each of the embodiments, another configuration can be added. A part of the configurations in each of the embodiments can be deleted or replaced.

For example, in FIG. 3, the two (or more) controllers CTLUa and CTLUb are mounted on the single microcontroller MCU. In some cases, they may be mounted separately in a plurality of microcontrollers. In the foregoing embodiments, triangle waves are synchronized, and communication has to be performed between the controllers CTLUa and CTLUb. Consequently, to realize higher speed of process and simplification, the controllers CTLUa and CTLUb are desirably mounted on a single microcontroller MCU. In this case, when two inverter circuits are controlled, the microcontroller MCU has six or more PWM signal output terminals and two or more AD conversion input terminals. In the case of controlling one inverter circuit and a PFC circuit, four or more output terminals of the PWM signal and two or more AD conversion input terminals are provided.

Although the PWM signal is generated by using a count value having a triangle-wave shape in this case, the invention is not limited to the triangle-wave shape. For example, the invention can be also similarly applied to the case of using a count value having a saw-tooth shape or the like. Further, although the PFC circuit of the single-phase type or the interleave type of two phases is used, in some cases, the invention can be applied to a PFC circuit of an interleave type of four phases or the like.

Supplemental Notes (1) A semiconductor device controlling a first switching circuit including a switching transistor driven by a first PWM signal and a shunt resistor detecting current flowing in the switching transistor, and a second switching circuit including a switching transistor driven by a second PWM signal and a shunt resistor detecting current flowing in the switching transistor, including:

a first PWM timing generation circuit generating an edge timing of a first PWM signal by using a first count value and a first comparison value supplied;

a second PWM timing generation circuit generating an edge timing of a second PWM signal of a plurality of phases by using a second count value as a count value which is the same as the first count value or having a relation of the same frequency or the integral multiple of frequencies of the first count value and whose timing at which the count value becomes the maximum value or minimum value is synchronized with that of the first count value;

a first AD conversion circuit converting an analog value detected by the shunt resistor in the first switching circuit to a digital value on the basis of a first AD conversion timing as a sampling timing;

a first AD conversion timing generation circuit generating the first AD conversion timing on the basis of the edge timing of the first PWM signal;

a second AD conversion circuit converting an analog value detected by the shunt resistor in the second switching circuit to a digital value on the basis of a second AD conversion timing as a sampling timing; and a second AD conversion timing generation circuit generating the second AD conversion timing on the basis of the edge timing of the second PWM signal, wherein the first or second PWM timing generation circuit shifts the generated edge timing so that an interval between the edge timing of one of the circuits and an AD conversion timing of the other circuit becomes equal to or larger than a predetermined reference value.

(1-1)

In the above-described (1), one of the first and second switching circuits is an inverter circuit of a common shunt type in which the shunt resistor is provided commonly for a plurality of phases, and the first PWM timing generation circuit verifies an interval between the edge timing of the first PWM signal and the second AD conversion timing or verifies an interval between the first AD conversion timing and the edge timing of the second PWM signal and, when the interval is less than a first reference value, shifts the edge timing of the first PWM signal so that the interval becomes equal to or larger than the first reference value.

(1-2)

In the above-described (1), one of the first and second switching circuits is an inverter circuit of a common shunt type in which the shunt resistor is provided commonly for a plurality of phases, and the second PWM timing generation circuit generates an edge timing of the second PWM signal every PWM cycle and, after that, shifts an edge timing in a first direction as one of a rising direction and a falling direction so as to be synchronized with the edge timing of the first PWM signal generated by the first PWM timing generation circuit.

(1-3)

In the above-described (1), the first switching circuit is an inverter circuit of a common shunt type in which the shunt resistor is provided commonly for a plurality of phases, the first PWM timing generation circuit generates an edge timing of the first PWM signal every PWM cycle and, after that, shifts an edge timing in a first direction as one of a rising direction and a falling direction in the first PWM signal of the plural phases so as to be synchronized with a fixed edge timing, and the fixed edge timing is preliminarily determined as a timing common for the PWM cycles so that an interval of adjacent edges becomes equal to or larger than a second reference value.

(2) A method of generating a timing of a switching system having: a first switching circuit including a switching transistor driven by a first PWM signal and a shunt resistor detecting current flowing in the switching transistor; and a second switching circuit including a switching transistor driven by a second PWM signal and a shunt resistor detecting current flowing in the switching transistor, one of the first and second switching circuits being an inverter circuit of a common shunt type in which the shunt resistor is provided commonly for a plurality of phases, the timing generating method including:

a first step of generating an edge timing of the first PWM signal by using a first count value and a first comparison value supplied;

a second step of generating an edge timing of the second PWM signal by using a second count value as a count value which is the same as the first count value or having a relation of the same frequency or the integral multiple of frequencies of the first count value and whose timing at which the count value becomes the maximum value or minimum value is synchronized with that of the first count value;

a third step of generating a first AD conversion timing as a sampling timing at the time of converting an analog value detected by the shunt resistor in the first switching circuit to a digital value;

a fourth step of generating a second AD conversion timing as a sampling timing at the time of converting an analog value detected by the shunt resistor in the second switching circuit to a digital value; and a fifth step of verifying an interval between the edge timing of the first PWM signal generated in the first step and the second AD conversion timing generated in the fourth step or verifying an interval between the first AD conversion timing generated in the third step and the edge timing of the second PWM signal generated in the second step and, when the interval is less than a first reference value, shifting the edge timing of the first PWM signal so that the interval becomes equal to or larger than the first reference value.

(2-1)

In the above-described (2), the timing generating method further includes a sixth step of verifying an interval between the edge timing of the second PWM signal and the first AD conversion timing or verifying an interval between the second AD conversion timing and the edge timing of the first PWM signal and, when the interval is less than a first reference value, shifting the edge timing of the second PWM signal so that the interval becomes equal to or larger than the first reference value.

(2-2)

In the above-described (2), the first switching circuit is an inverter circuit of a respective shunt type in which the shunt resistors are provided respectively for a plurality of phases, the second switching circuit is an inverter circuit of the common shunt type, in the second step, an edge timing in a first direction as one of a rising direction and a falling direction in the second PWM signal of plural phases is generated so that an interval between adjacent edges becomes equal to or larger than a second reference value which is larger than the first reference value, and in the fourth step, the edge timing in the first direction generated in the second step is received, and the second AD conversion timing is determined between adjacent edges.

(3) A method of generating a timing of a switching system having: a first switching circuit including a switching transistor driven by a first PWM signal and a shunt resistor detecting current flowing in the switching transistor; and a second switching circuit including a switching transistor driven by a second PWM signal and a shunt resistor detecting current flowing in the switching transistor, one of the first and second switching circuits being an inverter circuit of a common shunt type in which the shunt resistor is provided commonly for a plurality of phases, the timing generating method including:

a first step of generating an edge timing of the first PWM signal by using a first count value and a first comparison value supplied;

a second step of generating an edge timing of the second PWM signal by using a second count value having a relation of the same frequency or the integral multiple of frequencies of the first count value and whose timing at which the count value becomes the maximum value or minimum value is synchronized with that of the first count value and a second comparison value supplied; and a third step of shifting the edge timing in a first direction as one of a rising direction and a falling direction in edge timings of the second PWM signal generated in the second step so as to be synchronized with the edge timing of the first PWM signal generated in the first step.

(3-1)

In the above-described (3), in the first step, further, the edge timing in the first direction in the first PWM signal of a plurality of phases is generated every PWM cycle and, after that, when the interval between adjacent edges is less than a second reference value, an edge timing of a corresponding phase is shifted so that the interval becomes equal to or larger than the second reference value and in the third step, the edge timing in the first direction in the second PWM signal of a plurality of phases is shifted so as to be synchronous with the edge timing in the first direction shifted in the first step.

(3-2)

In the above-described (3-1), in the third step, the edge timing in the first direction in the second PWM signal of the plural phases generated is shifted so that a phase having a wider pulse width is assigned to an earlier or later timing in the edge timings in the first direction shifted in the first step, and the earlier timing or the later timing is determined on the basis of whether the first direction is the rising direction or the falling direction.

(4) A method of generating a timing of a switching system having: a first switching circuit including a switching transistor driven by a first PWM signal and a shunt resistor detecting current flowing in the switching transistor; and a second switching circuit including a switching transistor driven by a second PWM signal and a shunt resistor detecting current flowing in the switching transistor, the first switching circuit being an inverter circuit of a common shunt type in which the shunt resistor is provided commonly for a plurality of phases, the timing generating method including:

a first step of generating an edge timing of the first PWM signal by using a first count value and a first comparison value supplied;

a second step of generating an edge timing of the second PWM signal by using a second count value having a relation of the same frequency or the integral multiple of frequencies of the first count value and whose timing at which the count value becomes the maximum value or minimum value is synchronized with that of the first count value and a second comparison value supplied; and a third step of shifting the edge timing in a first direction as one of a rising direction and a falling direction in edge timings of the first PWM signal for a plurality of phases generated in the first step every PWM cycle so as to be synchronized with a fixed edge timing, wherein the fixed edge timing is determined preliminarily as a timing common for PWM cycles so that an interval between adjacent edges becomes equal to or larger than a second reference value.

(4-1)

In the above-described (4), in the third step, the edge timing in the first direction in the first PWM signal of a plurality of phases generated is shifted so that a phase having a wider pulse width is assigned to the earlier timing or the later timing in the fixed edge timings, and the earlier timing or the later timing is determined on the basis of whether the first direction is the rising direction or the falling direction.

(4-2)

In the above-described (4), the timing generating method further includes a fourth step of shifting the edge timing in the first direction in the edge timings of the second PWM signal generated in the second step every PWM cycle so as to be synchronized with the fixed edge timing.

What is claimed is:

1. A switching system comprising:
a first PWM timing generation circuit generating an edge timing of a first PWM (Pulse Width Modulation) signal by using a first count value and a first comparison value supplied;
a second PWM timing generation circuit generating an edge timing of a second PWM signal by using a second count value and a second comparison value supplied, the second count value being a count value which is the same as the first count value or having a relation of the same frequency or integral multiple of frequencies of the first count value and whose timing at which the count value becomes the maximum value or minimum value is synchronized with that of the first count value;

a first switching circuit including a switching transistor driven by the first PWM signal and a shunt resistor detecting current flowing in the switching transistor;

a second switching circuit including a switching transistor driven by the second PWM signal and a shunt resistor detecting current flowing in the switching transistor in the second switching circuit;

a first AD conversion circuit converting an analog value detected by the shunt resistor in the first switching circuit to a digital value at a first AD conversion timing as a sampling timing;

a first AD conversion timing generation circuit generating the first AD conversion timing on the basis of an edge timing of the first PWM signal;

a second AD conversion circuit converting an analog value detected by the shunt resistor in the second switching circuit to a digital value at a second AD conversion timing as a sampling timing; and a second AD conversion timing generation circuit generating the second AD conversion timing on the basis of an edge timing of the second PWM signal, wherein one of the first and second switching circuits is an inverter circuit of a common shunt type in which the shunt resistor is provided commonly for a plurality of phases, and wherein the first PWM timing generation circuit verifies an interval between an edge timing of the first PWM signal and the second AD conversion timing or an interval between the first AD conversion timing and an edge timing of the second PWM signal and, when the interval is less than a first reference value, shifts the edge timing of the first PWM signal so that the interval becomes equal to or larger than the first reference value.

2. The switching system according to claim 1, wherein the second PWM timing generation circuit generates an edge timing of the second PWM signal, after that, verifies an interval between the edge timing and the first AD conversion timing or verifies an interval between the second AD conversion timing and an edge timing of the first PWM signal and, when the interval is less than the first reference value, shifts the edge timing of the second PWM signal so that the interval becomes equal to or larger than the first reference value.

3. The switching system according to claim 1, wherein the first switching circuit is the inverter circuit of the common shunt type, wherein the second switching circuit is a PFC (Power Factor Correction) circuit, and wherein the second AD conversion timing generation circuit determines the second AD conversion timing using, as a reference, a timing at which the second count value becomes a maximum value or a minimum value.

4. The switching system according to claim 1, wherein the first switching circuit is an inverter circuit of a separate shunt type in which the shunt resistors are provided separately for a plurality of phases, wherein the second switching circuit is the inverter circuit of the common shunt type, wherein the second PWM timing generation circuit generates an edge timing in a first direction as one of a rising direction and a falling direction in the second PWM signal of a plurality of phases so that an interval between adjacent edges becomes equal to or larger than a second reference value which is larger than the first reference value, and wherein on receipt of the edge timing in the first direction generated by the second PWM timing generation circuit, the second AD conversion timing generation circuit determines the second AD conversion timing between adjacent edges.

5. The switching system according to claim 1, wherein the first PWM timing generation circuit comprises:

an up/down counter circuit generating the first count value;

a subtraction circuit subtracting a shift value based on a shift amount of the edge timing from the first comparison value;

an addition circuit adding the shift value to the first count value;

a selection circuit selecting either a comparison value from the subtraction circuit or a comparison value from the addition circuit according to whether the operation of the up/down counter circuit is a count-up operation or a count-down operation, and a comparison circuit comparing the first count value and the comparison value from the selection circuit.

6. The switching system according to claim 1, wherein the first PWM timing generation circuit, the second PWM timing generation circuit, the first AD conversion circuit, the second AD conversion circuit, the first AD conversion timing generation circuit, and the second AD conversion timing generation circuit are formed in a same semiconductor device.

7. A switching system comprising:

a first PWM timing generation circuit generating an edge timing of a first PWM (Pulse Width Modulation) signal by using a first count value and a first comparison value supplied;

a second PWM timing generation circuit generating an edge timing of a second PWM signal by using a second count value and a second comparison value supplied, the second count value being a count value which is the same as the first count value or having a relation of the same frequency or integral multiple of frequencies of the first count value and whose timing at which the count value becomes the maximum value or minimum value is synchronized with that of the first count value;

a first switching circuit including a switching transistor driven by the first PWM signal and a shunt resistor detecting current flowing in the switching transistor;

a second switching circuit including a switching transistor driven by the second PWM signal and a shunt resistor detecting current flowing in the switching transistor in the second switching circuit;

a first AD conversion circuit converting an analog value detected by the shunt resistor in the first switching circuit to a digital value; and a second AD conversion circuit converting an analog value detected by the shunt resistor in the second switching circuit to a digital value, wherein one of the first and second switching circuits is an inverter circuit of a common shunt type in which the shunt resistor is provided commonly for a plurality of phases, and wherein the second PWM timing generation circuit generates an edge timing of the second PWM signal every PWM cycle and, after that, shifts an edge timing in a first direction as one of a rising direction and a falling direction so as to be synchronized with an edge timing of the first PWM signal generated by the first PWM timing generation circuit.

8. The switching system according to claim 7,
wherein the first PWM timing generation circuit generates the edge timing in the first direction in the first PWM signal of plural phases every PWM cycle and, after that, when an interval between adjacent edges is less than a second reference value, shifts the edge timing of a corresponding phase so that the interval becomes equal to or larger than the second reference value, and
wherein the second PWM timing generation circuit shifts the edge timing in the first direction in the second PWM signal so as to be synchronized with the edge timing in the first direction after the shift by the first PWM timing generation circuit every PWM cycle.

9. The switching system according to claim 8,
wherein the second PWM timing generation circuit shifts the edge timing in the first direction in the second PWM signal of plural phases generated so that a phase having a wider pulse width is assigned to an earlier timing or a later timing in edge timings in the first direction after the shift by the first PWM timing generation circuit, and
wherein the earlier timing or the later timing is determined based on whether the first direction is the rising direction or the falling direction.

10. The switching system according to claim 8,
wherein the first switching circuit is the inverter circuit of the common shunt type or an inverter circuit of a separate shunt type in which the shunt resistors are separately provided for the plural phases, and
wherein the second switching circuit is the inverter circuit of the common shunt type.

11. The switching system according to claim 7,
wherein the first switching circuit is a PFC (Power Factor Correction) circuit, and
wherein the second switching circuit is the inverter circuit of the common shunt type.

12. The switching system according to claim 7,
wherein the second PWM timing generation circuit determines the edge timing in the first direction in the second PWM signal not as the same edge timing in the first PWM signal but so as to be deviated only by a predetermined fixed offset value.

13. The switching system according to claim 7,
wherein the second PWM timing generation circuit comprises:
an up/down counter circuit generating the second count value;
a subtraction circuit subtracting a shift value based on a shift amount of the edge timing from the second comparison value;
an addition circuit adding the shift value to the second count value;
a selection circuit selecting either a comparison value from the subtraction circuit or a comparison value from the addition circuit according to whether the operation of the up/down counter circuit is a count-up operation or a count-down operation, and
a comparison circuit comparing the second count value and a comparison value from the selection circuit.

14. The switching system according to claim 7,
wherein the first PWM timing generation circuit, the second PWM timing generation circuit, the first AD conversion circuit, and the second AD conversion circuit are formed in a same semiconductor device.

15. A switching system comprising:
a first PWM timing generation circuit generating an edge timing of a first PWM (Pulse Width Modulation) signal by using a first count value and a first comparison value supplied;
a second PWM timing generation circuit generating an edge timing of a second PWM signal by using a second count value and a second comparison value supplied, the second count value being a count value which is the same as the first count value or having a relation of the same frequency or the integral multiple of frequencies of the first count value and whose timing at which the count value becomes the maximum value or minimum value is synchronized with that of the first count value;
a first switching circuit including a plurality of switching transistors driven by the first PWM signal and a shunt resistor detecting current flowing in the switching transistors;
a second switching circuit including a plurality of switching transistors driven by the second PWM signal and a shunt resistor detecting current flowing in the switching transistors in the second switching circuit;
a first AD conversion circuit converting an analog value detected by the shunt resistor in the first switching circuit to a digital value; and
a second AD conversion circuit converting an analog value detected by the shunt resistor in the second switching circuit to a digital value,
wherein the first switching circuit is an inverter circuit of a common shunt type in which the shunt resistor is provided commonly for a plurality of phases,
wherein the first PWM timing generation circuit generates an edge timing of the first PWM signal of plural phases every PWM cycle and, after that, shifts an edge timing in a first direction which is one of a rising direction and a falling direction in the first PWM signal of the plural phases so as to be synchronized with a fixed edge timing, and
wherein the fixed edge timing is preliminarily determined as a common timing for PWM cycles so that an interval of adjacent edges becomes equal to or larger than a second reference value.

16. The switching system according to claim 15,
wherein the first PWM timing generation circuit shifts the edge timing in the first direction in the first PWM signal of plural phases so that a phase having a wider pulse width is assigned to an earlier timing or a later timing in the fixed edge timings, and
wherein the earlier timing or the later timing is determined based on whether the first direction is the rising direction or the falling direction.

17. The switching system according to claim 15,
wherein the second PWM timing generation circuit generates an edge timing of the second PWM signal every PWM cycle and, after that, shifts the edge timing in the first direction of the second PWM signal so as to be synchronized with the fixed edge timing.

18. The switching system according to claim 17,
wherein the second switching circuit is the inverter circuit of the common shunt type or an inverter circuit of a separate shunt type in which the shunt resistors are separately provided for the plurality of phases.

19. The switching system according to claim 15,
wherein the second switching circuit is a PFC (Power Factor Correction) circuit, wherein a sampling timing of the second AD conversion circuit is determined using, as a reference, a timing when the second count value becomes a maximum value or a minimum value, and wherein the fixed edge timing is determined so that the sampling timing of the second AD conversion circuit is positioned between adjacent edges in the fixed edge timings.

20. The switching system according to claim 15, wherein the first PWM timing generation circuit comprises:

an up/down counter circuit generating the first count value;

a subtraction circuit subtracting a shift value based on a shift amount of the edge timing from the first comparison value;

an addition circuit adding the shift value to the first count value;

a selection circuit selecting and outputting either a comparison value from the subtraction circuit or a comparison value from the addition circuit according to whether the operation of the up/down counter circuit is a count-up operation or a count-down operation, and a comparison circuit comparing the first count value and the comparison value from the selection circuit.

* * * * *